US006704784B2

(12) United States Patent
Matsuda et al.

(10) Patent No.: US 6,704,784 B2
(45) Date of Patent: *Mar. 9, 2004

(54) INFORMATION PROCESSING APPARATUS AND METHOD, INFORMATION PROCESSING SYSTEM AND PROGRAM PROVIDING MEDIUM

(75) Inventors: Koichi Matsuda, Tokyo (JP); Taketo Naito, Kanagawa (JP); Hiroshi Ueno, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/084,926

(22) Filed: Mar. 1, 2002

(65) Prior Publication Data

US 2002/0133592 A1 Sep. 19, 2002

Related U.S. Application Data

(63) Continuation of application No. 09/228,135, filed on Jan. 11, 1999, now Pat. No. 6,405,249.

(30) Foreign Application Priority Data

Jan. 23, 1998 (JP) .......................................... P10-026408

(51) Int. Cl.[7] .............................................. G06F 15/16
(52) U.S. Cl. ........................ 709/224; 709/226; 713/201
(58) Field of Search ................................. 709/203, 206, 709/217, 218, 224, 226, 232; 713/201; 455/428

(56) References Cited

U.S. PATENT DOCUMENTS

| 6,112,085 | A | * | 8/2000 | Garner et al. ................ 455/428 |
| 6,199,099 | B1 | * | 3/2001 | Gershman et al. ........... 709/203 |
| 6,253,167 | B1 | | 6/2001 | Matsuda et al. ............. 709/224 |
| 6,268,872 | B1 | | 7/2001 | Matsuda et al. ............. 709/226 |
| 6,405,249 | B1 | * | 6/2002 | Matsuda et al. ............. 709/224 |

* cited by examiner

Primary Examiner—Hosain Alam
Assistant Examiner—Khanh Quang Dinh
(74) Attorney, Agent, or Firm—Oblon, Spivak, McClelland, Maier & Neustadt, P.C.

(57) ABSTRACT

A terminal has a storage means for storing identification information, a transmitting means for transmitting the identification information stored in the storage means to a server, and a receiving means for receiving the identification information transmitted from the server. If no identification information is stored in the storage means, the terminal transmits information thereof to the server. The terminal receives identification information corresponding to predetermined information transmitted from the server in response to the information indicating that no identification information is stored in the storage means and stores the identification information received by the receiving means into the storage means. When an access is made from the terminal without accompanying identification information, the server generates identification information corresponding to predetermined information and registers the generated identification information to be provided to the terminal.

Consequently, the user can received predetermined services from the server without inputting user identification information into the terminal.

4 Claims, 26 Drawing Sheets

FIG. 2

ROUTE <u>Node Name.event Out Name</u> TO <u>Node Name.event In Name</u>
(ROUTE DECLARATION) (NODE NAME) (EVENTOUT NAME) (NODE NAME) (EVENTIN NAME)

MOOD INDEX
          10/10
GOOD
     7/10
          5/10
     3/10
BAD
          1/10

INTELIGENCE QUOTIENT

10/10

HIGH

7/10

5/10

3/10

LOW

1/10

INFORMATION PROCESSING APPARATUS AND METHOD, INFORMATION PROCESSING SYSTEM AND PROGRAM PROVIDING MEDIUM

BACKGROUND OF THE INVENTION

The present invention generally relates to an information processing apparatus, and information processing method, an information processing system, and a program providing medium. More particularly, the present invention relates to an information processing apparatus, an information processing method, an information processing system, and a program providing medium that allow a user to receive in a shared virtual reality space a particular service without inputting the user identification information such as a telephone number into the user's client PC, by holding the user identification (ID) in the registry of the client PC.

A cyberspace service named Habitat (registered trademark) is known in so-called personal computer communications services such as NIFTY-Serve (registered trademark) of Japan and CompuServe (registered trademark) of US in which a plurality of users connect their personal computers via modems and public telephone networks to the host computers installed at the centers of the services to access them in predetermined protocols.

Development of Habitat started in 1985 by Lucas Film of the US, operated by Quantum Link, one of US commercial networks, for about three years. Then, Habitat started its service in NIFTY-Serve as Fujitsu Habitat (trademark) in February 1990. In Habitat, users can send their alter egos called avatars (the incarnation of a god figuring in the Hindu mythology) as virtual reality objects into a virtual reality city called Populopolis drawn by two-dimensional graphics to have a chat (namely, a realtime conversation based on text entered and displayed) with each other in the virtual reality city. For further details of Habitat, refer to the Japanese translation "pp. 282–307" of "Cyberspace: First Steps," Michael Benedikt, ed., 1991, MIT Press Cambridge, Mass., ISBNO-262-02327-X, the translation being published Mar. 20, 1994, by NTT Publishing, ISBN4-87188-265-9C0010.

In the conventional cyberspace systems operated by personal computer communications services such as mentioned above, a virtual reality street and the inside of a room for example are drawn in two-dimensional graphics. Therefore, moving an avatar in the depth direction is realized simply by moving it up and down in the background of the two-dimensional graphics. This results in a poor expression in simulating walking and movement in a virtual reality space. Also, the two-dimensional virtual reality space in which own avatar and the avatar of another user are displayed is viewed from a viewpoint of a third party, thereby impairing the sense of simulated experience.

To overcome this drawback, a capability that enables a user to walk as desired with the viewpoint of the avatar of the user in a virtual reality space represented in three-dimensional graphics is realized by use of a three-dimensional graphics data description language called VRML (Virtual Reality Modeling Language) as disclosed in Japanese Patent Laid-open No. Hei 9-81781 corresponding to U.S. Patent application Ser. No. 678,340. Considerations about various cyberspaces in which chat is made by use of the avatar of a user are described in NIKKEI Electronics, Sep. 9, 1996, No. 670, pp. 151–159.

Recently, breeding simulation games for breeding tropical fish and a virtual reality creature having artificial intelligence living in a virtual reality world for example have come to be available as personal computer software programs. A product is also known that displays a simulated pet such as a dog or a cat on an electronic notepad to enjoy the process of its growth (refer to NIKKEI Electronics, Apr. 7, 1997, No. 686, pp. 131–134). In addition, "Tamagotchi" (registered trademark) developed and commercialized by Bandai Co. is widely known that is an egg-sized portable virtual reality pet with a breeding simulation game program as mentioned above incorporated.

Virtual reality pets of this type have a CPU (Central Processing Unit), a ROM (Read Only Memory), a RAM (Random Access Memory) and so on mounted on a single-chip LSI (Large Scale Integration), a breeding simulation game program being stored in the ROM, the figure and state of the pet being displayed on an LCD (Liquid Crystal Display) device. The user gives such instructions by operating buttons as "feed" and "broom" for example necessary for breeding the virtual reality creature as a pet. As a result of caring, the virtual reality creature displayed on the LCD grows stepwise from an egg to a chick to a grown-up bird for example in its external view.

The virtual reality creature is programmed such that proper instructions given help the virtual reality creature grow without problem and improper instructions given make it sick or, in the worst case, die. Further, the virtual reality creature is programmed to make various requests based on the time elapsing from its birth provided by an incorporated calendar timer. For example, in the nighttime zone, the virtual reality creature requests a sleep and, in the mealtime zone, it requests food. In other times, the virtual reality creature requests, at random, snack and play for example. If the user fails to answer these requests properly, the growth of the virtual reality creature may be retarded or its character worsens. If the user answers properly, the life of the virtual reality creature is lengthened.

Meanwhile, Japanese Patent Laid-open No. Hei 07-160853 corresponding to U.S. Pat. No. 5,572,646 discloses a technology applicable to an electronic notepad for example for displaying images according to the growth processes of a virtual reality creature such as an animal or a plant. To be more specific, bit-map images representing the growth processes of a plant character for example are stored in the ROM in the electronic notepad. The plant character according to the degree of growth is displayed on the LCD of the electronic notepad and, at the same time, characters representing plant growing elements (water, light, and fertilizer for example) are displayed. Necessary amounts of these growing elements are inputted by operating corresponding keys on the electronic notepad. The inputted values are set to a water-amount indicating register, a light-amount indicating register, and a fertilizer-amount indicating register respectively in the RAM of the electronic notepad. Based on the values set to these registers, a new degree of growth is computed. Then, the plant character corresponding to the computed degree of growth is read from the ROM to be displayed on the LCD. Thus, the plant growth process according to the state of cultivation by the user is displayed.

Thus, a pseudo pet (hereafter also referred to as a virtual reality pet or a virtual reality life object) grows into various states according to the operations made by the user, or its keeper. However, the related-art shared virtual reality spaces require users themselves to input information which identify the user, such as a telephone number into their client PCs in order to receive particular services. This inputting operation is cumbersome for users and time consuming.

SUMMARY OF THE INVENTION

It is therefore an object of the present invention to provide an information processing apparatus, an information processing system, and a program providing medium that allow each user to receive particular services without inputting the user identification information into the client PC, by holding the user identification (ID) in the registry of the client PC.

In carrying out the invention and according to one aspect thereof, there is provided an information processing apparatus comprising: a storage means for storing the identification information; a transmitting means for transmitting the identification information stored in the storage means to the server; and a receiving means for receiving the information corresponding to the identification information transmitted from the server; wherein, if the identification information is not stored in the storage means, the information processing apparatus transmits information thereof to the server through the transmitting means, receives through the receiving means the identification information corresponding to predetermined information transmitted from the server in response to the information indicating that no identification information is stored in the storage means, and stores the identification information received by the receiving means into the storage means.

In carrying out the invention and according to another aspect thereof, there is provided an information processing method for an information processing apparatus having a storage means for storing the identification information, the information processing method comprising the steps of: if the identification information is not stored in the storage means, transmitting transmits information thereof to the server through the transmitting means; receiving through the receiving means the identification information corresponding to predetermined information transmitted from the server in response to the information indicating that no identification information is stored in the storage means; and storing the identification information received by the receiving means into the storage means.

In carrying out the invention and according to still another aspect thereof, there is provided a program providing medium for providing a computer program for use in an information processing apparatus comprising: a storage means for storing the identification information; a transmitting means for transmitting the identification information stored in the storage means to-the server; and a receiving means for receiving the information corresponding to the identification information transmitted from the server; the computer program comprising the steps of: if the identification information is not stored in the storage means, transmitting transmits information thereof to the server; receiving through the receiving means the identification information corresponding to predetermined information transmitted from the server in response to the information indicating that no identification information is stored in the storage means; and storing the identification information received by the receiving means into the storage means.

In carrying out the invention and according to yet another aspect thereof, there is provided an information processing apparatus comprising: a generating means for generating, when access is made from the terminal without accompanying the identification information, the identification information corresponding to predetermined information; a registering means for registering the identification information generated by the generating means; and a providing means for providing the identification information generated by the generating means to the terminal.

In carrying out the invention and according to a different aspect thereof, there is provided an information processing method comprising the steps of: generating, when access is made from the terminal without accompanying the identification information, the identification information corresponding to predetermined information; registering the identification information generated by the generating means; and providing the identification information generated by the generating means to the terminal.

In carrying out the invention and according to a still different aspect thereof, there is provided a program providing medium for providing a computer program comprising the steps of: generating, when access is made from the terminal without accompanying the identification information, the identification information corresponding to predetermined information; registering the identification information generated by the generating means; and providing the identification information generated by the generating means to the terminal.

In carrying out the invention and according to a yet different aspect thereof, there is provided an information processing system having a terminal and a server, the terminal comprising: a storage means for storing the identification information; a transmitting means for transmitting the identification information stored in the storage means; and a receiving means for receiving the information corresponding to the identification information transmitted from the server; wherein, if the identification information is not stored in the storage means, the information processing apparatus transmits information thereof to the server through the transmitting means, receives through the receiving means the identification information corresponding to predetermined information transmitted from the server in response to the information indicating that no identification information is stored in the storage means, and stores the identification information received by the receiving means into the storage means; the server comprising: a generating means for generating, when access is made from the terminal without accompanying the identification information, the identification information corresponding to predetermined information; a registering means for registering the identification information generated by the generating means; and a providing means for providing the identification information generated by the generating means to the terminal.

In carrying out the invention and according to a separate aspect thereof, there is provided an information processing method for an information processing system which has a storage means for storing the identification information, comprising the steps of: if the identification information is not stored in the storage means, transmitting transmits information thereof to the server; receiving the identification information corresponding to predetermined information transmitted from the server in response to the information indicating that no identification information is stored in the storage means; and storing the identification information received by the receiving means into the storage means; and the server of the information processing method comprising the steps of: generating, when access is made from the terminal without accompanying the identification information, the identification information corresponding to predetermined information; registering the identification information generated by the generating means; and providing the identification information generated by the generating means to the terminal.

In carrying out the invention and according to a still separate aspect thereof, there is provided a program providing medium for providing a computer program to be executed in an information processing system which has a terminal and a server, comprising: a storage means for storing the identification information; a transmitting means for transmitting the identification information stored in the storage means to the server; and a receiving means for receiving the information corresponding to the identification information transmitted from the server; the computer program comprising the steps of: if the identification information is not stored in the storage means, transmitting transmits information thereof to the server; receiving the identification information corresponding to predetermined information transmitted from the server in response to the information indicating that no identification information is stored in the storage means; and storing the identification information received by the receiving means into the storage means; and in the server, the computer program comprising the steps of: generating, when access is made from the terminal without accompanying the identification information, the identification information corresponding to predetermined information; registering the identification information generated by the generating means; and providing the identification information generated by the generating means to the terminal.

According to an information processing apparatus described in claim 1 appended hereto, an information processing method described in claim 3 appended hereto, and a program providing medium described in claim 4 appended hereto, a terminal has a storage means for storing identification information, a transmitting means for transmitting the identification information stored in the storage means to a server, and a receiving means for receiving information corresponding to the identification information transmitted from the server. If no identification information is stored in the storage means, the terminal transmits information thereof to the server. The terminal receives identification information corresponding to predetermined information transmitted from the server in response to the above-mentioned information indicating that no identification information is stored in the storage means. The received identification information is then stored in the storage means. Consequently, the identification information for user identification can be held in a registry.

According to an information processing apparatus described in claim 1 appended hereto, an information processing method described in claim 3 appended hereto, and a program providing medium described in claim 4 appended hereto, if access is made from a terminal without accompanying identification information, identification information corresponding to predetermined information is generated. The generated identification information is registered to be provided to the terminal. Consequently, services corresponding to the user identification information can be provided.

According to an information system described in appended hereto, an information processing method described in appended hereto, and a program providing medium described in appended hereto, a terminal has a storage means for storing identification information, a transmitting means for transmitting the identification information stored in the storage means to a server, and a receiving means for receiving the identification information transmitted from the server. If no identification information is stored in the storage means, the terminal transmits information thereof to the server. The terminal receives identification information corresponding to predetermined information transmitted from the server in response to the information indicating that no identification information is stored in the storage means and stores the identification information received by the receiving means into the storage means. When an access is made from the terminal without accompanying identification information, the server generates identification information corresponding to predetermined information and registers the generated identification information to be provided to the terminal. Consequently, the user can receive predetermined services from the server without inputting user identification information into the terminal.

BRIEF DESCRIPTION OF THE DRAWINGS

These and other objects of the invention will be seen by reference to the description, taken in connection with the accompanying drawing, in which:

FIG. 2 is a diagram illustrating a routing;

DETAILED DESCRIPTION OF THE PREFERRED EMBODIMENTS

Figure 1:
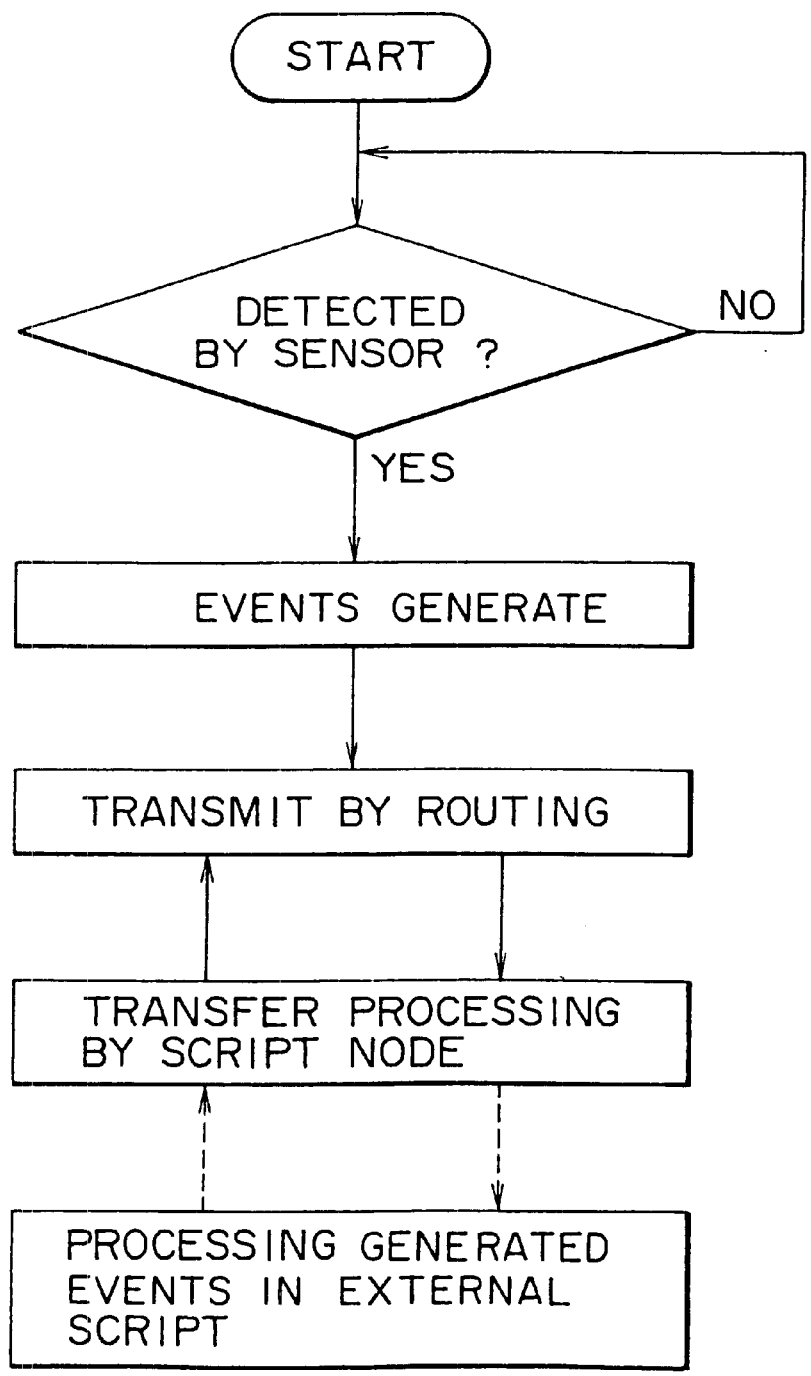
FIG. 1 is a flowchart for describing a relationship between a sensor, an event, a routing, and a script.

This invention will be described in further detail by way of example with reference to the accompanying drawings. In order to clarify the relationship between the means described in the claims appended hereto and the following embodiments of the invention, each of the means is followed by parentheses in which an example of the corresponding embodiment is enclosed.

An information processing apparatus described in claim 1 appended hereto comprises: a storage means (for example, the step S25 of FIG. 23) for storing the identification information; a transmitting means (for example, the step S26 of FIG. 23) for transmitting the identification information stored in the storage means to the server; and a receiving means (for example, the step S25 of FIG. 23) for receiving the information corresponding to the identification information transmitted from the server; wherein, if the identification information is not stored in the storage means, the information processing apparatus transmits information thereof (for example, the step S21 of FIG. 23) to the server through the transmitting means, receives (for example, the step S25 of FIG. 23) through the receiving means the identification information corresponding to predetermined information transmitted from the server in response to the information indicating that no identification information is stored in the storage means, and stores (for example, the step S25 of FIG. 23) the identification information received by the receiving means into the storage means.

An information processing apparatus described in claim 4 appended hereto comprises: a generating means (for example, the step S23 of FIG. 23) for generating, when access is made from the terminal without accompanying the identification information, the identification information corresponding to predetermined information; a registering means (for example, the step S23 of FIG. 23) for registering the identification information generated by the generating means; and a providing means (for example, the step S24 of FIG. 23) for providing the identification information generated by the generating means to the terminal.

An information processing system described in claim 9 appended thereto having a terminal and a server, the terminal comprises: a storage means (for example, the step S25 of FIG. 23) for storing the identification information; a transmitting means (for example, the step S26 of FIG. 23) for transmitting the identification information stored in the storage means; and a receiving means (for example, the step S25 of FIG. 23) for receiving the information corresponding to the identification information transmitted from the server; wherein, if the identification information is not stored in the storage means, the information processing apparatus transmits (for example, the step S21 of FIG. 23) information thereof to the server through the transmitting means, receives (for example, the step S25 of FIG. 23) through the receiving means the identification information corresponding to predetermined information transmitted from the server in response to the information indicating that no identification information is stored in the storage means, and stores (for example, the step S25 of FIG. 23) the identification information received by the receiving means into the storage means; the server comprising: a generating means (for example, the step S23 of FIG. 23) for generating, when access is made from the terminal without accompanying the identification information, the identification information corresponding to predetermined information; a registering means (for example, the step S23 of FIG. 23) for registering the identification information generated by the generating means; and a providing means (for example, the step S24 of FIG. 23) for providing the identification information generated by the generating means to the terminal.

First, there will be described VRML (Virtual Reality Modeling Language), which is a descriptive language enabling users to integrally handle three-dimensional information by use of the framework of the WWW (World Wide Web) for providing a variety of information through the Internet, a computer network built worldwide.

Meanwhile, for an information providing system available on the Internet, the WWW developed by CERN (European Center for Nuclear Research) in Switzerland is known. This technology allows a user to browse information including text, image and voice for example in the hyper text form. Based on HTTP (Hyper Text Transfer Protocol), the information stored in a WWW server terminal is sent asynchronously to terminals such as personal computers.

The WWW server is constituted by server software called an HTTP daemon and an HTML file in which hyper text information is stored. The wording "daemon" means a program for executing management and processing in the background upon working on UNIX. The hyper text information is described in a description language called HTML (Hyper Text Makeup Language). In the description of a hypertext by HTML, a logical structure of a document is expressed in a format specification called a tag enclosed by "<" and ">". Description of linking to other information is made based on link information called an anchor. A method in which a location at which required information is stored by the anchor is URL (Uniform Resource Locator).

A protocol for transferring a file described in HTML on the TCP/IP (Transmission Control Protocol/Internet Protocol) network is HTTP. This protocol has a capability of transferring a request for information from a client to the WWW server and the requested hyper text information stored in the HTML file to the client.

Used by many as an environment for using the WWW is client software such as Netscape Navigator (trademark of Netscape Communications Corp.) called a WWW browser.

Use of the WWW browser allows users to browse files, which are called home pages, corresponding to URLs stored in WWW servers on the Internet built worldwide, thereby performing net-surfing by sequentially following home pages linked to each other to access a variety of WWW information sources.

Recently, a VRML browser has been developed by extending this WWW. The VRML browser displays a three-dimensional space described in a three-dimensional graphics language called VRML that enables description of a three-dimensional space and setting of hypertext links to objects drawn in three-dimensional graphics, thereby allowing users to follow these links to sequentially access WWW servers.

Details of VRML are described in the Japanese translation of "VRML: Browsing & Building Cyberspace," Mark Pesce, 1995, New Readers Publishing, ISBN 1-56205-498-8, the translation being entitled "Getting to Know VRML: Building and Browsing Three-Dimensional Cyberspace,"

translated by Kouichi Matsuda, Terunao Gamaike, Shouichi Takeuchi, Yasuaki Honda, Junichi Rekimoto, Masayuki Ishikawa, Takeshi Miyashita and Kazuhiro Hara, published Mar. 25, 1996, Prenticehall Publishing, ISBN4-931356-37-0, as well as "Most Recent Trend of VRML And CyberPassage," Koichi Matsuda and Yasuaki Honda, the bit Magazine, Kyoritsu Publishing, 1996, Vol. 28, No. 7, pp. 29–36, No. 8, pp. 57–65, No. 9, pp. 29–36, No. 10, pp. 49–58.

The authorized and complete specifications of the Virtual Reality Modeling Language Version 2.0, ISO/IEC CD 14772 released on Aug. 4, 1996 is made public in http://webspace.sgi.com/moving-worlds/spec/index.html and its Japanese version is made public in http://www.webcity.co.jp/info/andoh/VRML/vrml2.0/specjp/index.html.

Further, for the browser for VRML 2.0 and the software for shared server, Sony Corporation, the present applicant, has developed and commercialized as "Community Place Browser/Bureau (registered trademark), of which beta version is downloadable from the Internet home page of Sony, http://vs.sony.co.jp.

To build a three-dimensional space by use of VRML 2.0, a VRML file for representing a desired content is created by generating graphics data indicative of the shape and behavior of an object (or a model) in the virtual reality space by use of VRML (model creation), adding the model in the virtual reality space displayed on the screen to a switch (or a sensor) for generating an event when the user clicks the model with the mouse for example, programming (or scripting) a script for realizing an event to be generated when the sensor is pointed, and relating (or routing) between graphics data and script (hereafter, common nodes such as write specified in graphics data, script, and VRML are also generically referred to as nodes) such as operating the sensor and starting the script.

For example, http://www.ses.co.jp/SES/STAFF/kan/howto/howto1.html describes in detail a method of writing VRML 2.0 and provides sample data. A part thereof will be outlined as follows.

1. How to view a world written in VRML 2.0

A VRML browser corresponding to VRML 2.0 is required like an HTML browser is required to view HTML-written data. It should be noted that the VRML 2.0 data in the above-mentioned Internet home page are all supported by Community Place Browser developed by Sony Corporation. To indicate that a file is written in VRML, extension "*.wrl" (denoting "world") must be provided to the file. To indicate that a file is written in VRML 2.0, "#VRML V2.0 utf8" must be written on the first line of the file.

2. Basic structure of VRML 2.0 data

VRML 2.0 data is constituted by a node and a field, which is basically written as follows:

Node {Field(s)}

In the above-mentioned file syntax, "Field(s)" may be omitted but "Node", and the braces, { }, cannot. A field passes a variable to a node to specify a node parameter. If the field is omitted, a default is used. There are two types of fields. A single-value field (SF) having only one value and a multiple-value field (MF) having two or more values. Each single-value field begins with "SF" and each multiple-value field begins with "MF."

3. How to draw a sphere

VRML 2.0 prepares nodes for drawing basic shapes such as sphere, rectangular parallelepiped (or box), cylinder, and cone. As mentioned above, each node has a field for specifying a parameter. For example, the Sphere node for drawing a sphere has the radius field for specifying the radius of the sphere. A sphere of radius 1 is drawn by writing as follows. It should be noted that, because the data type of the radius field is SFFloat, one floating-point value is provided.

Sample1

```
1:   #VRML V2.0 utf8
2:   Transform {
3:       children [
4:           Shape {
5:               geometry Sphere { radius 1 }
6:           }
7:       ]
8:   }
```

Actually, lines 2, 3, 7, and 8 may not be written. Lines 1, 4 through 6 alone are enough to represent the sphere of radius 1. The Transform node is one of the Group nodes, which is used to arrange nodes in a group. For detailed description of the capabilities and fields of the nodes including the Transform node, refer to "Appendix 1: VRML 2.0 Node List." The node for drawing a sphere is the Sphere. This node is one of Geometry nodes. Each geometry node must be written in the geometry field of the Shape node that specifies appearance and shape.

4. How to color a sphere

The following example is showing how to color a sphere:

Sample2

```
1:   #VRML V2.0 utf8
2:   Transform {
3:       children [
4:           Shape {
5:               appearance Appearance {
6:                   material Material { diffuseColor 1 0 0 }
7:               }
8:               geometry Sphere { radius 1 }
9:           }
10:      ]
11:  }
```

This sphere is represented in red. Lines 5 through 7 are added to sample 1. Because the data type of the diffusecolor field SFColor, only one set of three single-precision floating-point values representing RGB color is provided. The Material node for specifying appearance must be written in the material field of the Appearance node. The Appearance node must be written in the appearance field of the Shape node. Consequently, sample 2 has a structure that looks complicated.

5. How to attach a texture

An object can be not only colored but also attached with an image file. File formats available in VRML 2.0 as textures are JPEG, GIF, and PNG. The following sample uses a GIF-format texture.

Sample3

```
1:   #VRML V2.0 utf8
2:   Transform {
3:       children [
```

-continued

```
4:      Shape {
5:          appearance Appearance {
6:              texture ImageTexture { url "image.gif" }
7:          }
8:          geometry Box {}
9:      }
10:     ]
11: }
```

A texture is attached in line 6. Because the ImageTexture node must be written in the texture field of the Appearance node, the above-mentioned structure is obtained. It should be noted that the Box node on line 8 denotes a node for drawing a box.

6. How to move the object location

The resultant red sphere is then moved to the right as follows:

Sample4

```
1:  #VRML V2.0 utf8
2:  Transform {
3:      translation 2 0 0
4:      children [
5:          Shape {
6:              appearance Appearance {
7:                  material Material { diffuseColor 1 0 0 }
8:              }
9:              geometry Sphere { radius 1 }
10:         }
11:     ]
12: }
```

The object is translated in the translation field added to line 3. The translation field is:

translation x y z where shifts along x-, y-, and z-axes are specified. On the browser, the x-axis corresponds to the left and right directions (incremental in the right), the y-axis corresponds to up and down directions (incremental upward), and the z-axis corresponds to depth (incremental towards the user). Therefore, translation 2 0 0 represents that the object translates to the right by 2.

7. How to add an object

Next, a green cone is added to the left of the above-mentioned red sphere as follows:

Sample5

```
1:  #VRML V2.0 utf8
2:  Transform {
3:      translation 2 0 0
4:      children [
5:          Shape {
6:              appearance Appearance {
7:                  material Material { diffuseColor 1 0 0 }
8:              }
9:              geometry Sphere { radius 1 }
10:         }
11:     ]
12: }
13: Transform {
14:     translation -2 0 0
15:     children [
16:         Shape {
17:             appearance Appearance {
18:                 material Material { diffuseColor 0 1 0 }
19:             }
20:             geometry Cylinder {}
21:         }
22:     ]
23: }
```

The sources added to lines 13 and after have the same structures as those of lines 12 and before. Differences are that the object is a cone (not a sphere), the color is green (not red), and the position shifted to the left.

8. How to draw by polygon

In the above-mentioned VRML 2.0 writing samples, primitive objects are used. To draw a more complicated object, a polygon is used. For polygon representation, two nodes IndexedLineSet and IndexedFaceSet are prepared. IndexedLineSet represents a line and IndexedFaceSet represents a face.

Sample6

```
1:  #VRML V2.0 utf8
2:  Transform {
3:      children [
4:          Shape {
5:              geometry IndexedFaceSet {
6:                  coord Coordinate {
7:                      point [
8:                          0 0 0,
9:                          1 0 0,
10:                         1 0 1,
11:                         0 0 1,
12:                         0 1 0,
13:                         1 1 0,
14:                         1 1 1,
15:                         0 1 1
16:                     ]
17:                 }
18:                 coordIndex [
19:                     0, 1, 2, 3, -1,
20:                     0, 1, 5, 4, -1,
21:                     1, 2, 6, 5, -1,
22:                     2, 3, 7, 6, -1,
23:                     3, 0, 4, 7, -1,
24:                     4, 5, 6, 7, -1
25:                 ]
26:                 solid FALSE
27:             }
28:         }
29:     ]
30: }
31: }
```

The above-mentioned sample represents a solid with six surfaces. For polygonal representation, coordinates providing the apexes are determined first (lines 7 through 16). These coordinates are numbered 0, 1, 2 from the top. Namely, "1 0 1" on line 10 denotes coordinate No. "2." Next, which coordinates are used to form a surface is determined (lines 18 through 25). Namely, "0, 1, 2, 3, -1" on line 19 indicates that the surface is formed by coordinates Nos. 0, 1, 2, and 3.

9. How to name a node

DEF and USE keywords are prepared for reusing an already defined node. Assume to draw two blue spheres of radius 2 for example. Following the syntax used in the examples so far, these spheres are drawn as follows:

Sample7

```
1:   #VRML V2.0 utf8
2:   Transform {
3:        children [
4:             Shape {
5:                  appearance Appearance {
6:                       material Material { diffuseColor 0 0 1 }
7:                  }
8:                  geometry Sphere { radius 2 }
9:             }
10:       ]
11:  }
12:  Transform {
13:       translation 0 5 0
14:       children [
15:            Shape {
16:                 appearance Appearance {
17:                      material Material { diffuseColor 0 0 1 }
18:                 }
19:                 geometry Sphere { radius 2 }
20:            }
21:       ]
22:  }
```

Lines 12 and after are generally the same as lines 11 and before except for the part of translation of the coordinate. It is obviously a waste to describe the already defined "blue sphere of radius 2" once again in a similar manner. Therefore, the description must be made as shown in the following revised sample:

Revised Sample7

```
1:   #VRML V2.0 utf8
2:   Transform {
3:        children [
4:             DEF BlueSphere Shape {
5:                  appearance Appearance {
6:                       material Material { diffuseColor 0 0 1 }
7:                  }
8:                  geometry Sphere { radius 2 }
9:             }
10:       ]
11:  }
12:  Transform {
13:       translation 0 5 0
14:       children [
15:            USE BlueSphere
16:            }
17:       ]
18:  }
```

Line 4 is DEF BlueSphere Shape. This denotes that "Shape { . . . . . . }" is defined as "BlueSphere." Subsequently, only writing "USE BlueSphere" represents "Shape { . . . . . . }."

10. How to read a WRL file

When creating VRML data of a relatively large size, it is not a good practice to make all descriptions in one file. It is convenient to divide the data into parts so that they can be called separately. The Inline node is provided for this purpose. For example, "Sample1.wrl" created in sample1 is read and displayed as follows:

Sample8

```
1:   #VRML V2.0 utf8
2:   Inline {
3:        url [
```

-continued

```
4:             sample1.wrl
5:        ]
6:   }
```

11. How to hyperlink objects

Objects can be linked with each other, so that clicking an object causes a jump to another page.

Sample9

```
1:   #VRML V2.0 utf8
2:   Anchor {
3:        children [
4:             Shape {
5:                  geometry Sphere { radius 2 }
6:             }
7:        ]
8:        url "test.html"
9:        description "LINK to test.html"
10:  }
```

The nodes to be linked are made as children nodes, which are grouped by the Anchor node. The Anchor node is one of the Group nodes. A character string written in the description field is displayed while the mouse pointer is in contact with an object.

12. How to set Lighting

In VRML 2.0, the DirectionalLight, PointLight, and SpotLight nodes are provided for lighting the world. In the following description, the PointLight node is used for example. The object is rotated on line 3 to make clear how light is projected onto the object.

Sample10

```
1:   #VRML V2.0 utf8
2:   Transform {
3:        rotation 1 0 0 0.75
4:        children [
5:             PointLight {
6:                  location 0 0 2 #
7:             }
8:             Shape {
9:                  geometry Cylinder {}
10:            }
11:       ]
12:  }
```

The appearance of the object depends on the light source location on line 6. In this sample, the light source is located in front of the object.

13. World environment (1)

So far, the descriptions have been made mainly about the creation of objects. The following describes the use of nodes for other than object creation. It should be noted that the term "world environment" used herein may not be a generally accepted phrase. First, the Headlight, a default of the browser, is turned off. On/off of the Headlight can be changed by the Option of the browser or can be set by writing into the file.

Sample11

```
1:   #VRML V2.0 utf8
2:   NavigationInfo {
```

-continued

```
 3:        headlight FALSE
 4:    }
 5:    Transform {
 6:        children [
 7:            Shape {
 8:                appearance Appearance {
 9:                    material Material { diffuseColor 1 0 0 }
10:                }
11:                geometry Sphere {}
12:            }
13:        ]
14:    }
```

In the Option of the browser, Headlight is unchecked in this sample. In this sample, it is extremely dark as compared with the samples before. A headlight is the light always being projected in the direction in which the user is looking. If the headlight is turned off, it looks like this sample. Newly added is the NavigationInfo node on lines 2 through 4. Setting the headlight field from TRUE to FALSE turns off the headlight. Turning off the headlight and setting another lighting can effectively set brightness.

14. World environment (2)

The NavigationInfo node provides several other fields. The navigation method can be altered by the type field of this node. The navigation method is set to WALK as default. The other navigation methods are FLY enabling the user to navigate by ignoring gravity, EXAMINE enabling the user to move an object without navigating himself, and NONE enabling the user to control nothing. With WALK, navigation is made under the influence of gravity.

Sample12

```
 1:  #VRML V2.0 utf8
 2:  NavigationInfo {
 3:      type EXAMINE
 4:  }
 5:  Transform {
 6:      children [
 7:          Shape {
 8:              appearance Appearance {
 9:                  material Material { diffuseColor 1 0 0 }
10:              }
11:              geometry Box {}
12:          }
13:      ]
14:  }
```

In this sample, EXAMINE is set to the type field. Therefore, dragging an object with the mouse rotates the object.

15. How to attach a title to scene

In HTML, a title can be attached to a scene by enclosing it with the title tag. If this tag is not specified, a path such as "http://yro1.is.kochiu . . . howto3.html" is displayed for the title. This also occurs in VRML. Since no title is specified in the samples so far, so that a path is displayed. To specify a title with VRML, the WorldInfo node is used.

Sample13

```
 1:  #VRML V2.0 utf8
 2:  WorldInfo {
 3:      title "Spin Box"
 4:      info["Autor H. Kan", "http://ryo1.is.kochi-u.ac.jp/"]
 5:  }
```

-continued

```
 2:  NavigationInfo {
 3:      type EXAMINE
 4:  }
 5:  Transform {
 6:      children [
 7:          Shape {
 8:              appearance Appearance {
 9:                  material Material { diffuseColor 1 0 0 }
10:              }
11:              geometry Box {}
12:          }
13:      ]
14:  }
```

The WorldInfo node is added on lines 2 through 5. In this sample, title "Spin Box" is attached to previous samples (the title is not displayed in the plug-in version). It should be noted that information about other than a title is written in the info field without affecting the display in the browser.

16. How to change the viewpoint location

In default, the viewpoint is somewhere on the z-axis (depending on object arrangement). The default viewpoint location can be altered to a desired location as shown in the following sample.

Sample14

```
 1:  #VRML V2.0 utf8
 2:  Viewpoint { position x y z }
 3:  Transform {
 4:      children [
 5:          Shape {
 6:              appearance Appearance {
 7:                  material Material { diffuseColor 1 0 0 }
 8:              }
 9:              geometry Sphere {}
10:          }
11:      ]
12:  }
13:  Transform {
14:      translation -3 0 0
15:      children [
16:          Shape {
17:              appearance Appearance {
18:                  material Material { diffuseColor 0 1 0 }
19:              }
20:              geometry Sphere {}
21:          }
22:      ]
23:  }
24:  Transform {
25:      translation 3 0 0
26:      children [
27:          Shape {
25:              appearance Appearance {
29:                  material Material { diffuseColor 0 0 1 }
30:              }
31:              geometry Sphere {}
32:          }
33:      ]
34:  }
```

A red sphere is located at (0, 0, 0), a green sphere at (−3, 0, 0), and a blue sphere at (3, 0, 0). Specifying particular coordinates in the position field of the Viewpoint node on line 2 provides the first viewpoint. It should be noted that the sight line direction is always along the z-axis.

17. How to change the sight-line direction

In sample14, only the viewpoint coordinates were altered. obviously, the sight-line direction can also be specified. The Viewpoint node is also used for directional specification. For the field for the directional specification of the sight-line field, however, the orientation field is used. The orientation field is a field of SFRotation type and has a point add axis and a rotational angle as values.

18. How to attach a sensor

VRML 2.0 has the Sensor nodes for sensing and determining various things in a scene. There are seven Sensor nodes. In Community Place Browser of which operation is being checked by the present Web page, some of the Sensor nodes are not yet supported. The. TouchSensor for sensing whether the mouse has hit an object is attached to an object as shown in the following sample.

Sample15

```
1:  #VRML V2.0 utf8
2:  Transform {
3:      children [
4:          DEF TS TouchSensor {}
5:          Shape {
6:              geometry Box {}
7:          }
8:      ]
9:  }
```

This sample differs from the previous ones only in line 4. In this sample, the TouchSensor named TS is applied to the Box. When the mouse cursor touches the Box, if your browser is Community Place Browser, the cursor takes on a hand shape, while some other browsers do not change the cursor. If the mouse is clicked in this state, nothing happens.

19. How to apply a motion (1)

A major difference of VRML 2.0 from VRML 1.0 lies in that a motion can be applied to scene. A motion can be applied by use of a script such as Java and VRMLScript (JavaScript) or the Interpolator node. First, a method of applying a motion by use of the Interpolator node will be described. The word Interpolator means such as to interpolate, slip in, put in, insert. Changing the numeric value, location, 3D coordinate, orientation, normal, or color of the Interpolator node can apply a motion to a scene. In the following sample, an object is rotated by use of the OrientationInterpolator node for interpolating orientation.

Sample16

```
1:  #VRML V2.0 utf8
2:  DEF OBJ Transform {
3:      children [
4:          Shape
5:              geometry Box { size 2 3 1 }
6:          }
7:      }
8:  }
9:  DEF TS TimeSensor {
10:     cycleInterval 1
11:     loop TRUE
12:     stopTime -1
13: }
14: DEF OI OrientationInterpolator{
15:     key [0. 0.125, 0.25, 0.375, 0.5,
16:         0.625, 0.75, 0.875, 1,]
17:     keyValue [0 1 0 0, 0 1 0 0.785, 0 1 0 1.57,
18:         0 1 0 2.355, 0 1 0 3.14, 0 1 0 -2.355,
19:         0 1 0 -1.57, 0 1 0 -0.785, 0 1 0 0]
20: }
21: ROUTE TS.fraction_changed TO OI.set_fraction
22: ROUTE OI.value_changed TO OBJ.set_rotation
```

First, some nodes are named beforehand. OBJ, TS, and OI are defined on lines 2, 9 and 14 respectively. They are required for event passing described later. Look at lines 9 through 13. The TouchSensor is the node for sensing elapse of time, generating events at certain time intervals as time passes. The loop field is an SFBool field that takes TRUE or FALSE. If TRUE, the loop continues until the stopTime is reached. In this sample, the stopTime is −1, which is lower than the startTime (default is 0), so that the loop continues infinitely. To slow down the rotary motion, the value of the cycle interval is increased.

The OrientationInterpolator node is defined on lines 14 through 20. Each Interpolator node has the two fields, key and keyvalue. In the key field, an animation time interval is set to a value from 0 to 1. In the keyValue field, a particular field value (in this sample, MFRotation) is set to the interval set in the key field. In this sample, the animation time interval is divided into 9 and the rotational angle is set around the y-axis.

However, the above-mentioned settings alone cannot apply a motion to a scene. An event generated by the TimeSensor node must be passed to the OrientationInterpolator node. Look at lines 21 and 22. The event is passed on each line beginning with keyword ROUTE. When the TimeSensor TS starts, "fraction_changed" is passed out. When "fraction_changed" is passed out, it is passed into the "set_fraction" of the OrientationInterpolator OI. These are operations of the ROUTE of line 21. On line 22, the OrientationInterpolator OI interpolates the value "set_fraction." The interpolation result is passed out to the translation field of the Transform OBJ as "value_changed." One more sample is shown below.

20. How to apply a motion (2)

In the following sample, clicking an object with the mouse causes the object to move. For the motion, the PositionInterpolator node is used.

Sample17

```
1:  #VRML V2.0 utf8
2:  DEF OBJ Transform {
3:      children [
4:          DEF TS TouchSensor {}
5:          Shape {
6:              appearance Appearance {
7:                  material Material { diffuseColor 1 0 0 }
8:              }
9:              geometry Box {}
10:         }
11:     ]
12: }
13: DEF TIS TimeSensor { cycleInterval 5 }
14: DEF PI PositionInterpolator {
15:     key [0, 0.2, 0.4, 0.6, 0.8, 1.0]
16:     keyValue[0 0 0 , 0 0 -2 , 0 2 -4 , 0 4 -6 , 2 4 -6, 4 2 -6]
17: }
18: ROUTE TS.touchTime TO TIS.set_startTime
19: ROUTE TIS.fraction_changed TO PI.set_fraction
20: ROUTE PI.value_changed TO OBJ.set_translation
```

In this sample, a red box named OBJ is attached with the TouchSensor TS. When the object is clicked, the touchTime of the TouchSensor is passed out to the startTime field of the TimeSensor TIS. In the source of this sample, the startTime field is not written in the TimeSensor node but startTime 0 is set as default. The remaining portion is the same as sample16. These ROUTEs move the object.

The following describes a mechanism for realizing an autonomous behavior in a VRML space, a new capability added to the second generation VRML 2.0, not found in the first generation VRML 1.0.

VRML 2.0 realizes an autonomous movement (Behavior) of an object according to an event to be caused by an operation performed on the object arranged in a three-dimensional virtual reality space and a timer event that occurs when a preset time has been reached. The mechanism of this Behavior is realized by the cooperation of three elements; sensor, routing, and script as follows.

(1) A sensor node described as a VRML file related to a node such as an object arranged in a three-dimensional virtual reality space beforehand senses an external event based on a change in its field value to generate an event in a VRML scene.

(2) The generated event is transmitted to an external script, which is a program for specifying the behavior of the object based on a routing described as a VRML file.

(3) The external script describes beforehand a method to be called when a particular event is received. The external script, which has received the event transmitted by the routing, executes the processing based on the description and then changes the value of the field of the corresponding node in the VRML scene based on the result of the processing and the description of the routing.

For sensor nodes, the VRML 2.0 defines TouchSensor that causes an event when the pointing device passes over a specified object or the same is clicked by the user, ProximitySensor that causes an event when ViewPoint (of the user) enters a specified region, and TimeSensor that is caused every time a preset time interval elapses, for example.

The following describes the mechanism of Behavior more in detail. As described above, the mechanism of Behavior is implemented by a sensor, an event, a routing, and a script.

The sensor is functionally divided into the following two types: the type for sensing a user operation; and the type for sensing a system change.

The sensor for sensing a user operation provides a software switch related to an object arranged in a three-dimensional virtual reality space. The sensor for sensing a system change starts a timer preset to a start time. These sensors sense these external events and convert them into events inside VRML.

The event indicates data for transmitting information between associated nodes in VRML. Actually, a change in a field value described in a VRML file is transmitted as an event.

The routing is a mechanism for specifying to which node an event sensed by the sensor capability is to be transmitted. Actually, the routing specifies a path of information transmission by the event.

The script provides an input/output port, performs some computation from an inputted event, and outputs a result of the computation. The script is not restricted to a particular language. In the current stage, the script can be written in Java (registered trademarks of Sun Microsystems, Inc.) and JavaScript noticed in the Internet, C language widely used in ordinary systems, Tcl/Tk and Perl widely used in UNIX, or Visual Basic provided by Microsoft Corporation. Thus, VRML 2.0 does not depend on a particular script language (in the course of defining VRML 2.0 specifications, employment of VRMLScript as particular language specifications was discussed but this idea was eventually discarded).

The following describes the processing means of Behavior with reference to FIG. 1. The processing by Behavior is diagramatically represented as shown in FIG. 1. The following describes flows of processing signals.

(1) Sensor node

As described above, the sensor node is largely classified into two types; a sensor for sensing a user operation and a sensor for sensing a system change.

The sensor for sensing a user operation has sensor nodes such as TouchSensor and PlaneSensor for sensing a mouse click on a three-dimensional object and passing of a pointing device over a plane of the three-dimensional object. The sensor for sensing a system change has TimeSensor adapted to generate an event when a preset time has been reached.

In the example of FIG. 1, it is assumed that TouchSensor is attached to a sphere. When an user clicks the sphere, this event is sensed by TouchSensor. This event is sensed because the field value of the eventout field of TouchSensor changes. Generally, one mouse click operation generates two events; namely, the timing of pressing the mouse button and the timing of releasing the mouse button.

Then, this event is routed by the routing description part.

(2) Routing

"Route" as shown in FIG. 2 specifies routing of this event.

When an event caused in the sensor description part is transmitted to the eventout field of the Route and then to a script node to be described below, the event is passed to the external file, upon which the Behavior capability is executed.

(3) Script node

This is a node for mediating the interlocking between a VRML file and an external script. This node specifies the language in which the description is made and a file name according to the description format of the script node, and the eventin field and the eventout field in order to give and take the event to and from the external script file. Available script files include those written in Java, JavaScript, C language, Tcl/Tk, Perl, and Visual Basic.

In actual processing, the processing is transmitted to the script file in which the routed event is described in the script node and the external script file is executed. The external script file is received through eventIn (event entrance) defined in it and the processing described in that file is executed. When this processing has come to an end, the processing result is returned through eventout (event exit) to the routing of the VRML file. The VRML file executes this returned result, upon which the series of Behavior processing operations come to an end.

Use of the mechanism of Behavior to be realized by the above-mentioned cooperation between the sensor, the routing, and the script allows the user to dynamically change the external view (shape, attitude, size, color, and so on) or behavioral sequence for example of an object arranged in a three-dimensional virtual space by clicking an object resembling a switch also arranged in this space.

Details of the Behavior mechanism is disclosed in Section 4 "Concept" in the Specifications "The Virtual Reality Modeling Language Version 2.0," ISO/IEC CD 14772, Aug. 4, 1996 which is made public in http://webspace.sgi.com/movingworlds/spec/part1/concepts.html and its Japanese version http://www.webcity.co.jp/info/andoh/VRML/vrml2.0/specjp/part1/concepts.html. This section describes the key concepts to use of the VRML specifications. These concepts include various general node-related items such as a method of linking a node to a scene graph, a method in which a node generates or receives an event, a method of generating a node type by a prototype, a method in which a node type is added to VRML and then exported to be made available from outside, and a method of incorporating a script to operate as a program into a VRML file.

The following describes a technology in which, by application of the mechanism for realizing the above-mentioned autonomous movement (Behavior) of VRML 2.0, a virtual reality life object is created in a shared virtual space, growth parameters (external growth or internal growth (personality)) that change according to the generation of an event such as a user operation or passing of a predetermined time are controlled by a server, and a script program for dynamically change one or both of the external view (shape, attitude, size, color, and so on) and the behavioral sequence of the created virtual reality life object based on the growth parameters transferred from this server is interpreted and executed, thereby displaying the virtual reality life object according to the growth parameters.

Figure 3:
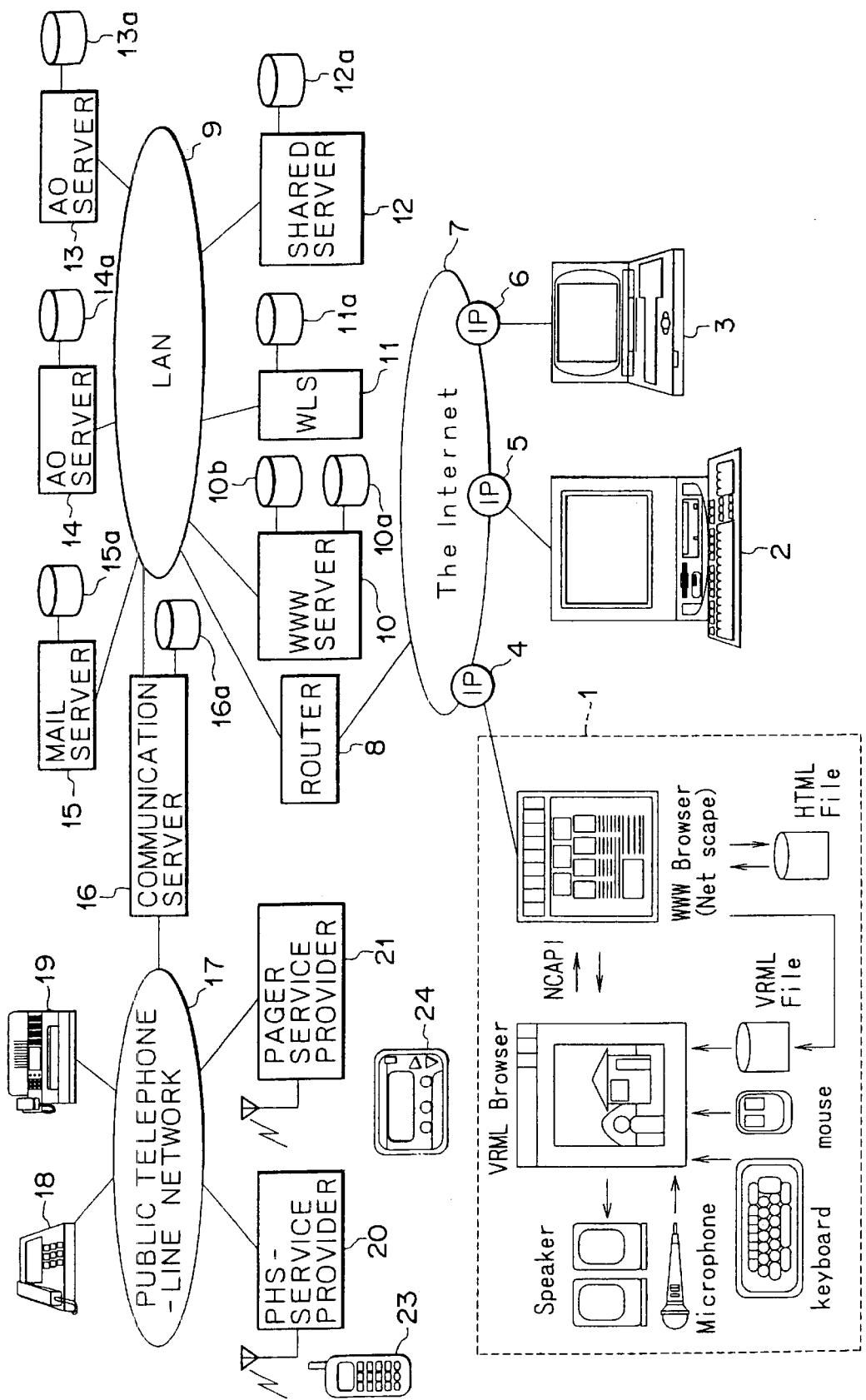
FIG. 3 is a block diagram illustrating an example of a constitution of a shared virtual reality space providing system associated with the present invention.

FIG. 3 is a schematic diagram illustrating an entire system practiced as one preferred embodiment of the present invention.

In FIG. 3, reference numerals 1, 2, and 3 denote client PCs (Personal Computers) on which a VRML browser and a WWW browser are installed and operating. These PCs are connected to the Internet 7 through IPs (Internet Service Provider) 4, 5, and 6.

A LAN (Local Area Network) connected to the Internet 7 through a router 8 is connected to a WWW server 10, a WLS (World Location Server) 11, a shared server 12, AO (Application Object) servers 13 and 14, a mail server 15, and a communication server 16. The WWW server is provided with hard disk (HDD) 10a and 10b, the WLS server 11 with a hard disk 11a, the shared server 12 with a hard disk 12a, the AO server 13 with a hard disk 13a, the AO server 14 with a hard disk 14a, the mail server 15 with a hard disk 15a, and the communication server 16 with a hard disk 16a.

The communication server 16 is connected to a telephone 18 and a facsimile 19 through a public telephone network 17, to a PHS (Personal Handyphone System) terminal 23 through a PHS service provider 20 in a wireless manner, and to a paging terminal 24 through a paging service provider 21 in a wireless manner.

Figure 4:
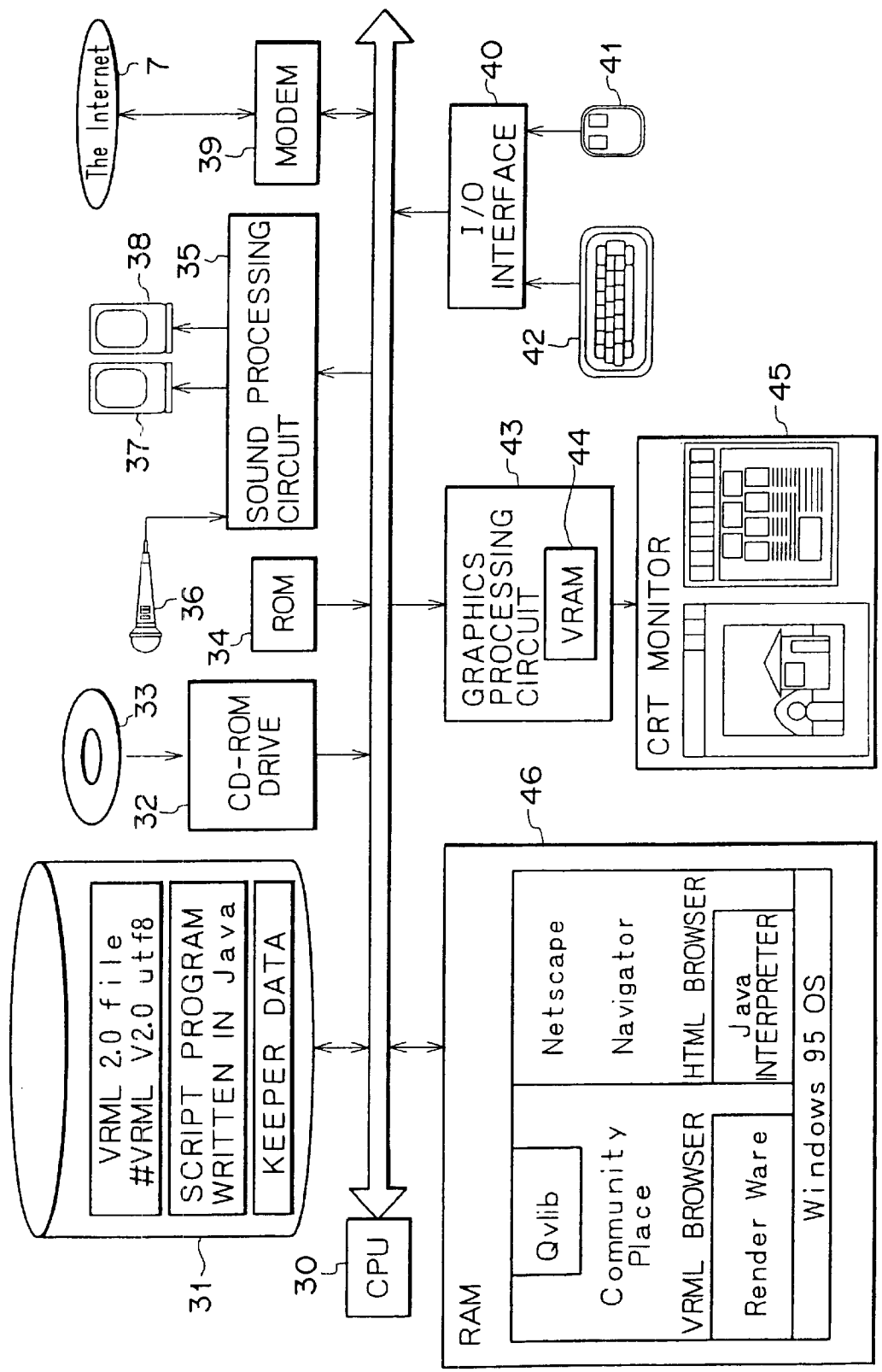
FIG. 4 is a block diagram illustrating an example of a constitution of the client PC 1 shown in FIG. 1.

FIG. 4 is a schematic block diagram illustrating a hardware constitution of the client PC 1.

In FIG. 4, reference numeral 30 denotes a CPU (Central Processing Unit) for controlling this client PC. Reference numeral 31 denotes a hard disk storing VRML contents composed of a VRML 2.0 file and a growth script program for a shared virtual reality life by Java (registered trademark of Sun Microsystems, Inc.), and data about the keeper of the virtual creature. Reference numeral 32 denotes a CD-ROM drive for reading VRML contents stored in a CD-ROM disc 33. Reference numeral 34 denotes a ROM storing a BIOS (Basic Input/Output System) and so on. Reference numeral 35 denotes a sound processor connected to a microphone 36 and left and right speakers 37 and 38. Reference numeral 39 denotes a MODEM through which this client PC is connected to the Internet 7. Reference numeral 40 denotes an I/O (Input/Output) interface connected to a mouse 41 and a keyboard 42. Reference numeral 43 denotes a graphics processor incorporating a VRAM (Video RAM) 44. Reference numeral 45 denotes a CRT monitor. Reference numeral 46 denotes a RAM.

In the RAM 46, Netscape Navigator, which is a WWW browser operating on Windows 95 (registered trademark of Microsoft Corporation), the Java interpreter, and Community Place Browser, which is a VRML 2.0 browser developed by Sony Corporation, are read at run time and are ready for execution by the CPU 30.

The VRML 2.0 browser is installed with QvLib, which is a VRML syntax interpreting library (parser) developed by Silicon Graphics, Inc. in U.S.A. and offered without charge, RenderWare, which is a software renderer developed by Criterion Software Ltd. in England, and so on or other parser and renderer having equivalent capabilities.

As shown in FIG. 3, Community Place Browser transfers data of various types with Netscape Navigator, a WWW browser, based on NCAPI (Netscape Client Application Programming Interface) (registered trademark).

Receiving an HTML file and VRML content (including a VRML file and a script program written in Java) from the WWW server 10, Netscape Navigator stores them in the local HDD (Hard Disk Drive) 31. Netscape Navigator processes the HTML file to display text and images on the CRT monitor. On the other hand, Community Place Browser processes the VRML file to display a three-dimensional virtual space on the CRT monitor and changes the behavior of the object in the three-dimensional virtual space according to the result of processing of the script program by the Java interpreter.

It should be noted that the other client PCs 2 and 3 have generally the same constitutions, not shown, as that of the PC 1 described above. It should also be noted that the transmission paths constituting the network 7, the LAN 9, and the public telephone network and the transmission paths interconnecting these networks may be based on cable or radio.

The following describes the operation of the above-mentioned preferred embodiment.

First, a sequence spanning from actually downloading the VRML content through the Internet to providing a multi-user environment in which one virtual space is shared by plural users is described with reference to FIGS. 5 through 7.

Figure 5:
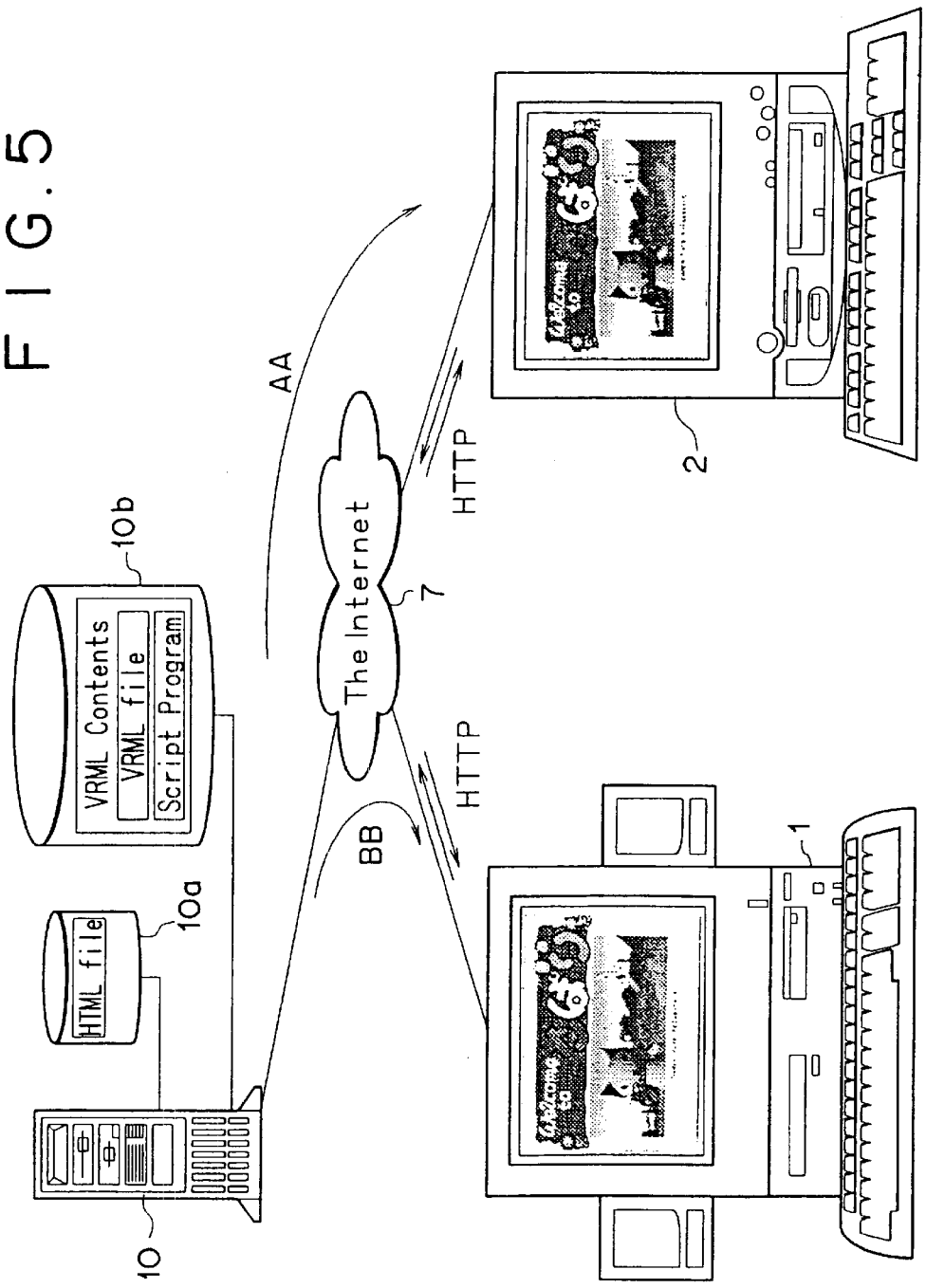
FIG. 5 shows photographs for describing an operation of the system shown in FIG. 3.

Referring to FIG. 5, the home page of the Web site that provides the VRML content is browsed by use of the WWW browser as indicated by the arrow AA. In this example, home page http://pc.sony.co.jp/sapari/ is browsed. Next, as indicated by the arrow BB, the users of the client PC 1 and the client PC 2 download the VRML content composed of the VRML 2.0 file and the script program (the growth script program written in Java) for realizing an autonomous movement (Behavior) in the VRML space.

Obviously, the VRML content provided in the CD-ROM disc 33 may be read by the CD-ROM drive 32.

Figure 6:
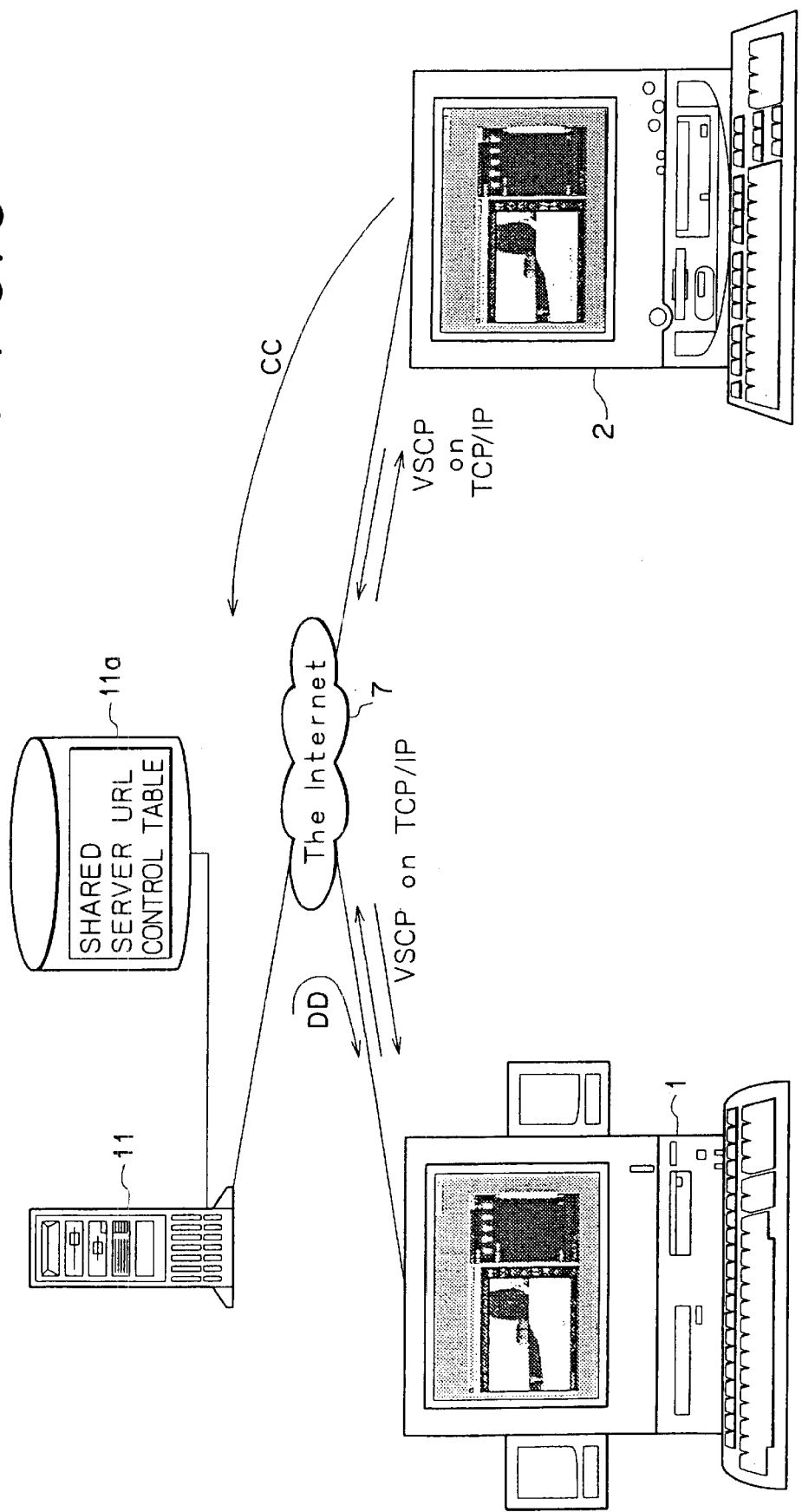
FIG. 6 shows photographs for describing another operation of the system shown in FIG. 3.

Then, as shown in FIG. 6, in the client PC 1 and the client PC 2, the VRML 2.0 file downloaded and stored in the local HDD 31 is interpreted and executed by Community Place Browser, which is a VRML 2.0 browser. Next, as indicated by arrow CC, the client Pcs ask the WLS 11 for the URL of the shared server 12 based on VSCP (Virtual Society Server Client Protocol). In response, as indicated by arrow DD, the WLS 11 references the shared server URL control table stored in the HDD 11a and sends the URL of the shared server 12 to the client PC 1 and the client PC 2.

Figure 7:
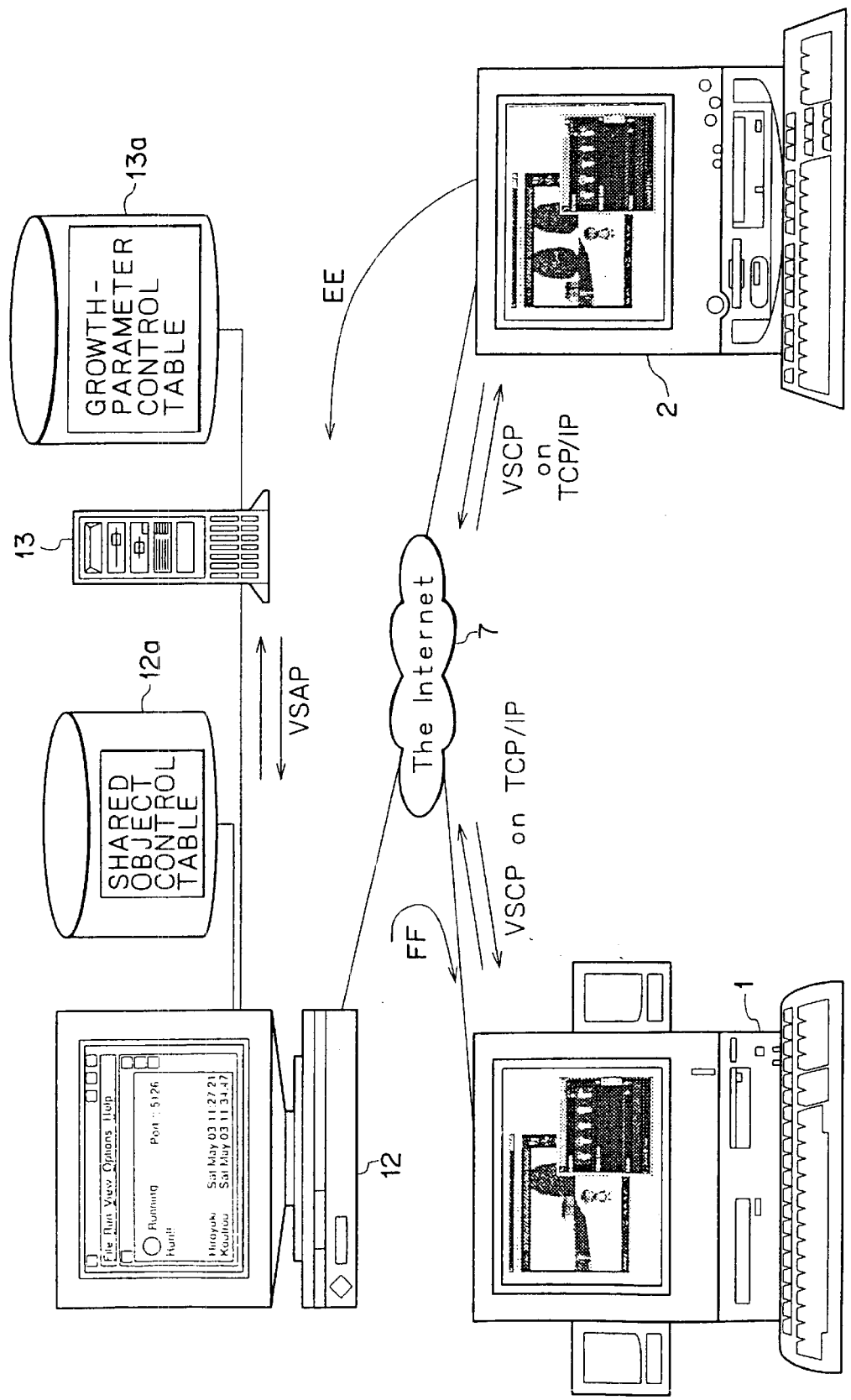
FIG. 7 shows photographs for describing another operation of the system shown in FIG. 3.

Using this URL, the client PC 1 and the client PC 2 are connected to the shared server 12 as shown in FIG. 7. As a result, as shown by the arrow EE, shared messages associated with the position and movement of the shared 3D object are transmitted through this shared server 12. These messages are transferred as shown by the arrow FF to realize the multi-user environment.

For detailed description of the procedure of the above-mentioned connection, refer to Japanese Patent Laid-open No. Hei 9-81781 corresponding to U.S. patent application Ser. No. 678,340.

The following describes the AO server 13 that controls the behavior of a virtual reality life object existing in the shared virtual space. The AO server 13 transfers data associated with the virtual reality life object with the shared server 12 based on VSAP (Virtual Society Server Application Protocol). The AO server is functionally divided into a plurality of AOs. For example, a universal AO, only oneself exists in a virtual reality space, covers all over that virtual reality space, monitoring the login and logout operations of all users. The universal AO uses the attribute capability of community Place Browser to understand the contents of the registry of each client PC and write predetermined information into the registry. In addition, the universal AO issues a user identification (equivalent to a 3D object ID when one user can rear one virtual reality pet) and resister this user identification to the growth parameter control table, for example. The universal AO also can broadcast information to all users joining the shared virtual reality space.

An object AO controls the virtual reality objects placed in a virtual reality space other than the virtual reality life objects and, when any of these objects is picked up by a user, controls the picked-up object as a possession of that user.

An agent AO controls a virtual reality pet that a user can rear in a shared virtual reality space and assigns one virtual reality pet to one user for example.

An area AO sets a special capability to a predetermined area in a shared virtual reality space. For example, the area AO allows a battle area to make virtual reality life objects compete with each other. The area AO allows a chat area to store all chat logs. The user can retrieve past remarks for use in currently performed conversation. The area AO allows a trash recycle area to discard objects thrown in.

All AOs including the object AO, the agent AO, and the area AO are generated and controlled by the universal AO.

Figure 8:
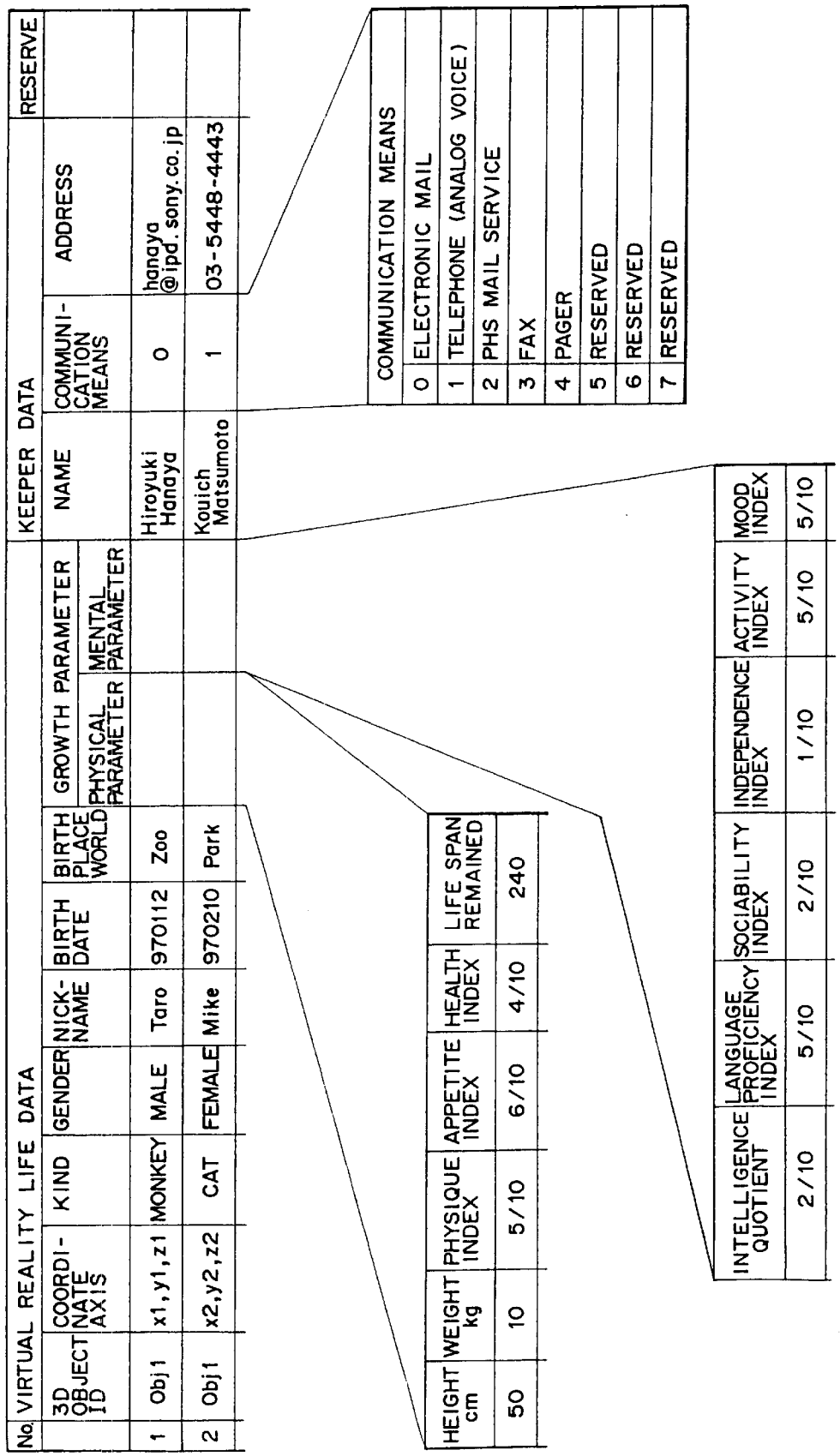
FIG. 8 is a diagram illustrating an example of a growth parameter control table.

FIG. 8 shows the growth parameter control table. It should be noted that the data associated with the virtual reality life object are largely classified into virtual reality life data and keeper data.

The virtual reality life data includes a 3D object ID for uniquely identify a 3D object in one shared virtual space, three-dimensional coordinate values representing the virtual reality life object in the shared virtual space, a type of a creature such as a monkey or a cat selected by the keeper, the gender of the creature, its nickname given by the keeper, a date initialized by the keeper, namely the birth date of the virtual reality life object, a world name (a world name of domicile of origin) given to the virtual space in which the virtual reality life object was born, and growth parameters of the virtual reality life object.

The growth parameters are largely classified into physical parameters for specifying the external growth of the virtual reality life and mental parameters for specifying the internal growth of the avatar reflecting its character.

The physical parameters are composed of height (in centimeters), weight (in kilograms), physique index, appetite index, health index, and remaining life time (in hours).

The mental parameters include intelligence quotient, language capability index, sociability index, independence index, activity index, and mood index.

These parameters are sequentially updated to values computed by a predetermined growth parameter computing equation based on a timer event caused when certain time has passed after the birth date initialized by the keeper, and an access event and an operation event caused by a call message and an operation message from the client PC.

Figure 9:
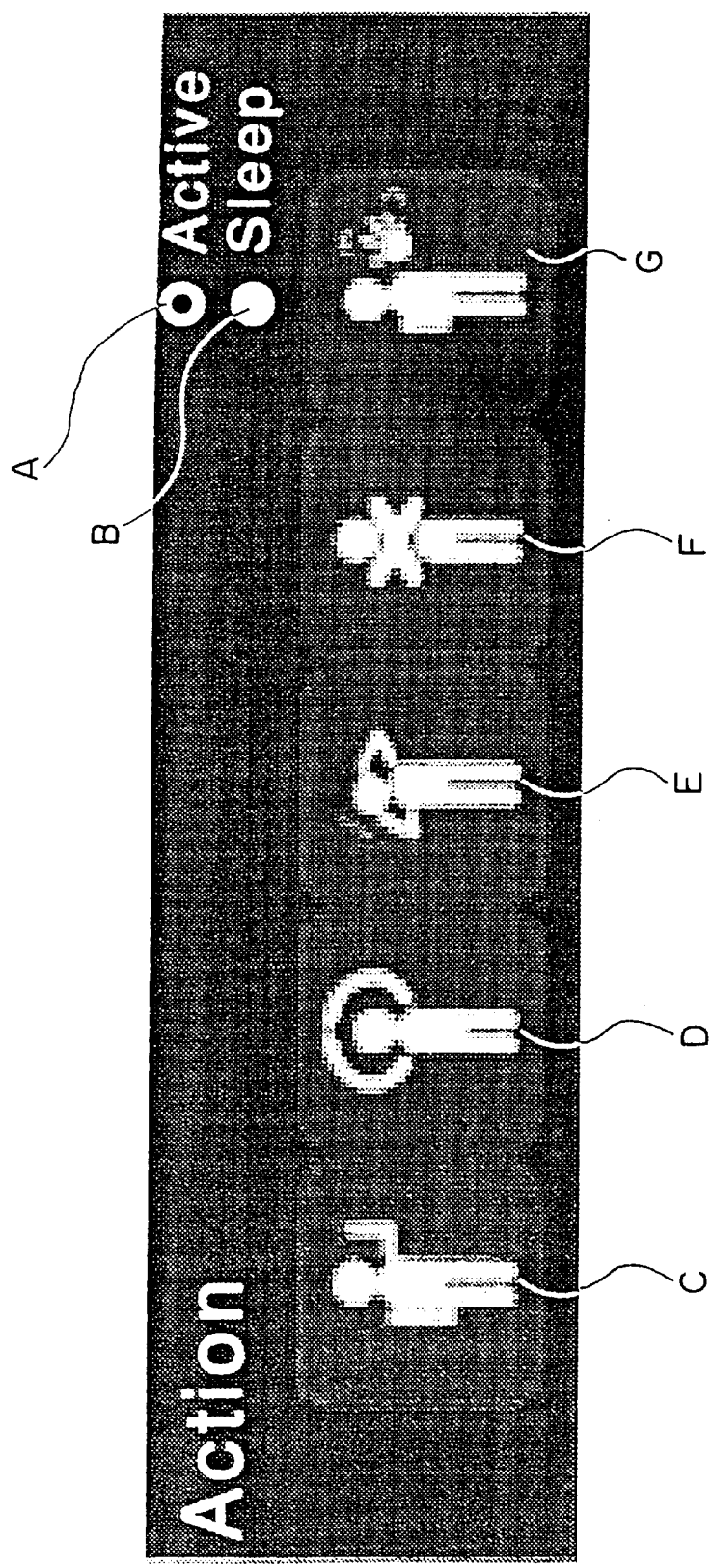
FIG. 9 shows a photograph for describing an action panel.

FIG. 9 shows capabilities of an action panel displayed beside the main window of the VRML browser on the CRT monitor screen of the client PC 1.

In FIG. 9, "A" denotes a calling button represented as "Active." This button is clicked to call the virtual reality pet or wake up the sleeping virtual reality pet.

"B" represented as "Sleep" denotes a button for putting the virtual reality pet to bed.

"C" denotes a feeding button. This button is clicked to feed the virtual reality pet.

"D" denotes a praise button. This button is clicked to praise the virtual reality pet by smiling at it.

"E" denotes of a play button. This button is clicked to play tag, in which the keeper chases the virtual reality pet until the same is blocked by a wall and cannot be escaped therefrom.

"F" denotes a scold button. This button is clicked to scold the virtual reality pet for discipline.

"G" denotes a groom button. This button is clicked to groom the virtual reality pet by brushing.

Figure 10:
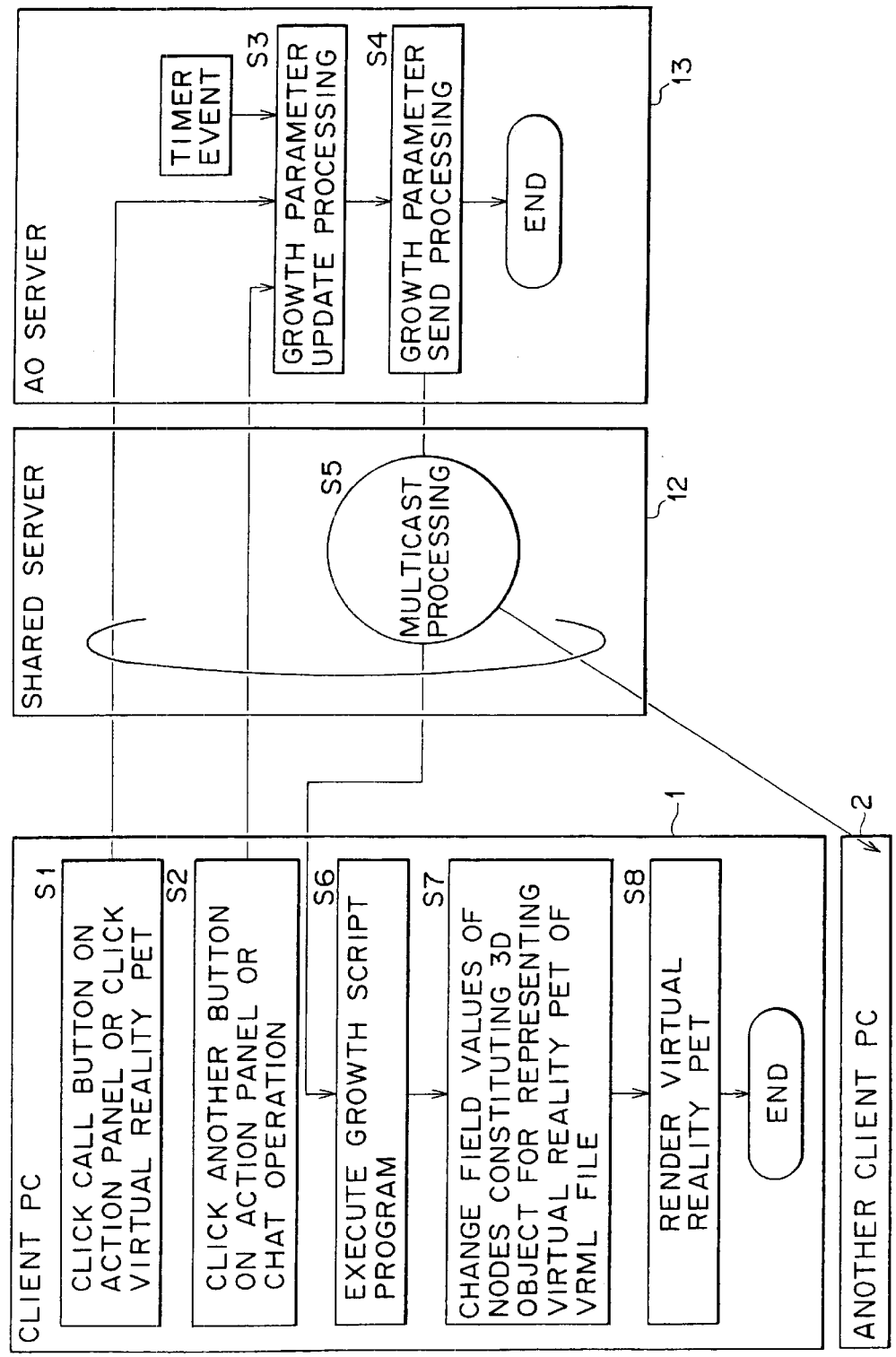
FIG. 10 is a diagram illustrating passing of a growth parameter.

As shown in FIG. 10 for example, when the call button A is clicked (the action panel is operated) on the own client PC 1 and a resultant call message is sent to the AO server 13 through the shared server 12 (step S1), growth parameter update processing is performed on the growth parameter control table based on that access event (step S3). Based on this access event, the appetite index, the health index, and the mood index are each incremented by 0.1 point from 1/10 to 10/10.

If the feeding button C is clicked for example and a resultant message is sent to the AO server 13 (step S2), the weight of the growth parameter increase every time the operation event occurs, along which the physique index is incremented by 0.1 point from 1/10 to 10/10 (step S3).

Then, when the timer event occurs as a result of passing of a predetermined time, the weight, one of the growth parameters, decreases, decrementing the physique index by 0.1 point (step S3).

For example, the growth parameters including this physique index are transferred (step S4) to the client PC 1 of the original keeper and another client PC 2 sharing the virtual space by multicast processing (step S5) of the shared server 12 every time the growth parameters are updated.

The client PC 1 executes the growth script program described with a processing procedure for controlling the autonomous behavior resulted from the virtual reality pet growth based on the growth parameters (step S6), changes the field values of the nodes constituting the 3D object for representing the virtual reality pet in the VRML file (step S7), performs rendering on the virtual reality pet on which the changed field values are reflected (step S8), and displays the rendered virtual reality pet on the main window of the VRML browser on the CRT monitor screen of the client PC 1.

The same processing performed by the client PC 1 is also performed on the other client PC 2 sharing the virtual space. Consequently, rendering is performed on the appearance of the virtual reality pet on which the field value changed along the growth of the virtual reality pet is reflected, and the rendered virtual reality pet is also displayed on the main window of the VRML browser on the CRT monitor of the other client PC 2.

Figure 11:
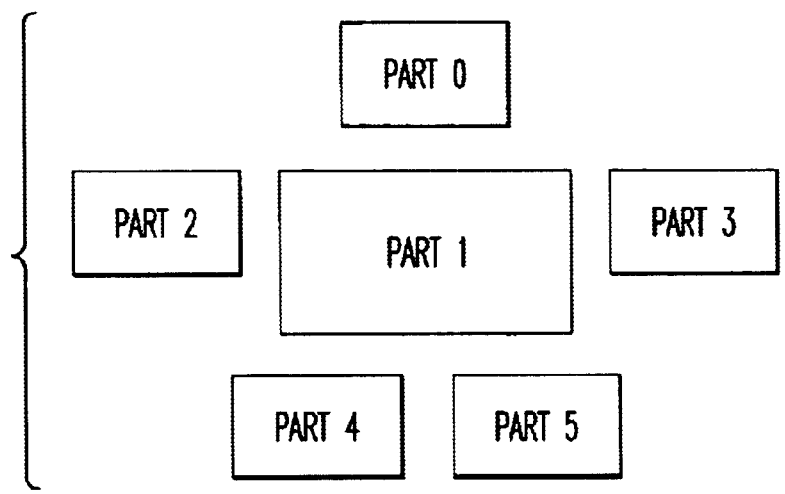
FIG. 11 is a diagram for describing virtual reality life object nodes constituting a 3D object.
Figure 12:
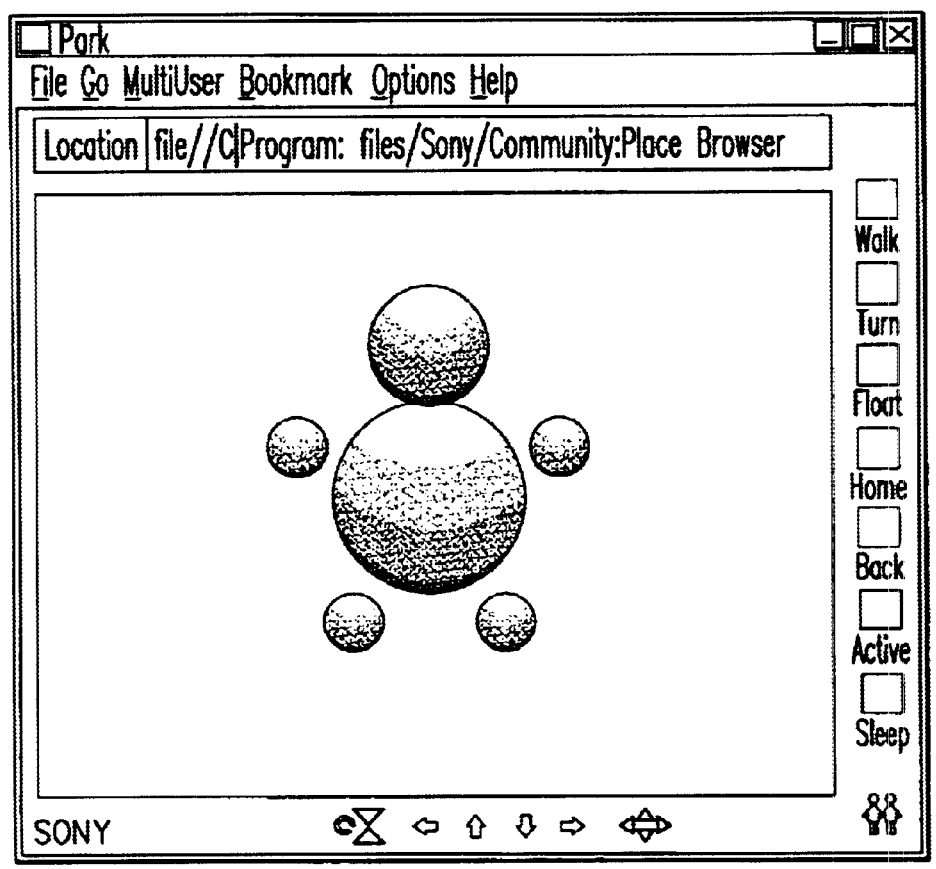
FIG. 12 shows a display photograph indicative of a display example corresponding to the nodes shown in FIG. 11.

FIG. 11 shows a relationship between part 0 through part 5 corresponding to the nodes constituting a 3D object for representing a virtual reality pet in the VRML file. FIG. 12 shows an example of displaying these parts. Part 0 corresponds to the head of the virtual reality pet, part 1 to its body, part 2 and part 3 to its right and left arms, and part 4 and part 5 to its right and left legs.

Changing the field values of the nodes corresponding to these parts 0 through 5 can dynamically change the external view (shape, attitude (orientation), size, color, and so on) and the behavioral sequence of each part of the virtual reality pet. These are all realized by the processing of the growth script program based on the growth parameters. Namely, these are realized by use of the mechanism of Behavior to be realized by the cooperative operation between the sensor, the routing, and the script defined in VRML 2.0.

Therefore, unlike the conventional method of displaying images of a virtual creature of portable electronic pet, it is unnecessary to store the bit-map images representing each growth process of the character of virtual creature in the ROM beforehand. Namely, use of the mechanism of Behavior can continuously and dynamically change the physique and behavior of a virtual reality pet according to its growth process for example.

Figure 13:
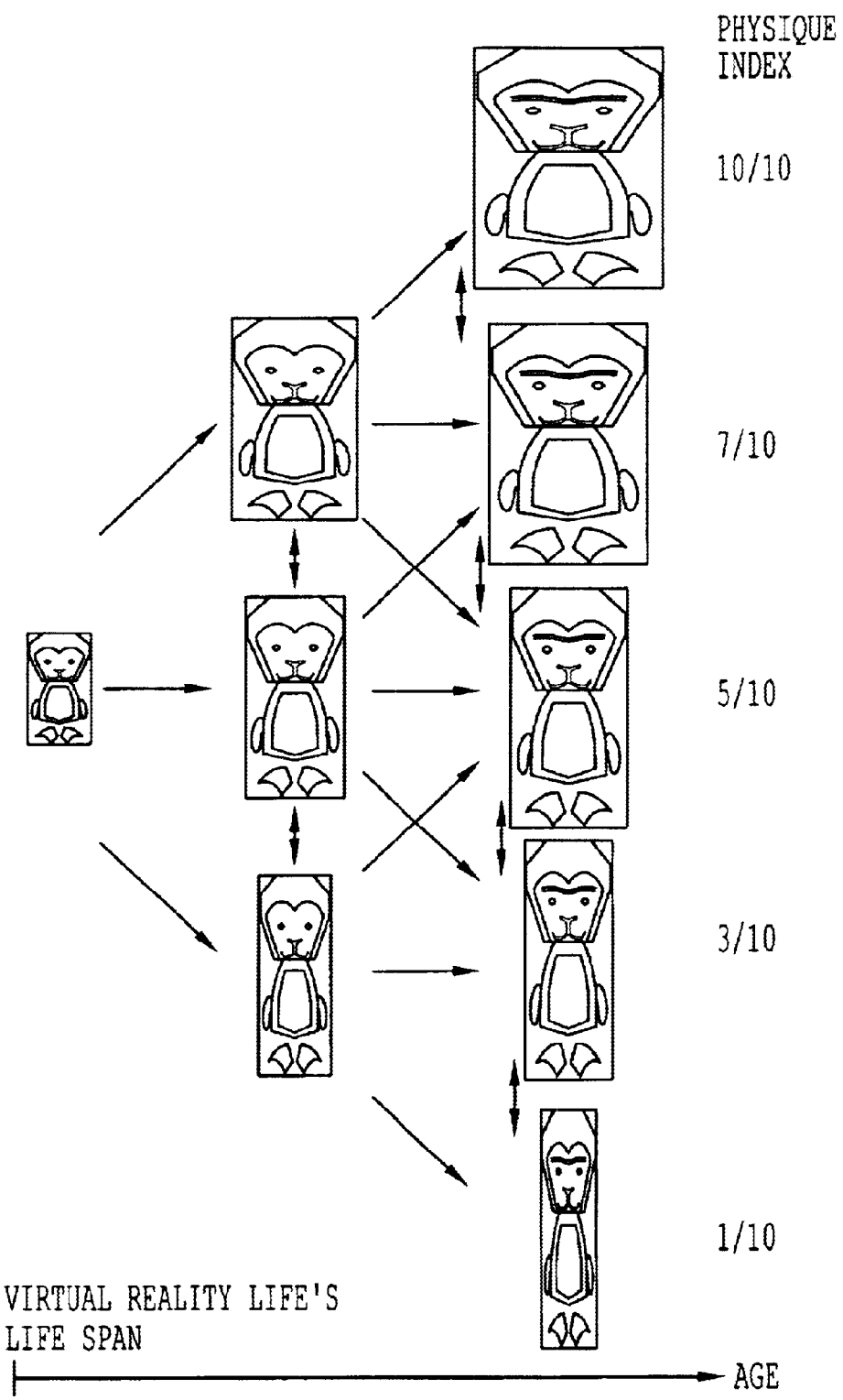
FIG. 13 is a diagram for describing virtual reality life object physique index.

FIG. 13 is a conceptual diagram in which the physique of a virtual reality pet is dynamically changed as the virtual reality pet grows and its physique index changes. As the virtual reality pet grows in age, its face becomes that of an adult and its physique becomes larger. If the physique index is small, the avatar becomes thin; if it is large, the avatar becomes thick.

Figure 14A:
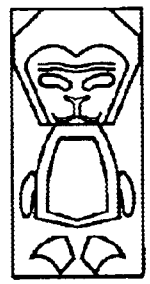
FIGS. 14A through 14C are diagrams for describing virtual reality life object mood index.
Figure 14B:
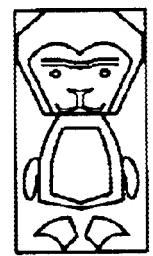
Figure 14C:
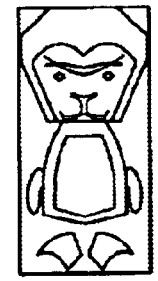

FIGS. 14A through 14C are conceptual diagrams in which the countenance of the virtual reality pet is dynamically changed as its mood index changes. When the mood index is high, the face of the virtual reality pet smiles as shown in FIG. 14A; when it is low, an angry expression appears on the face as shown in FIG. C.

Figures 15A, 15B, 15C:
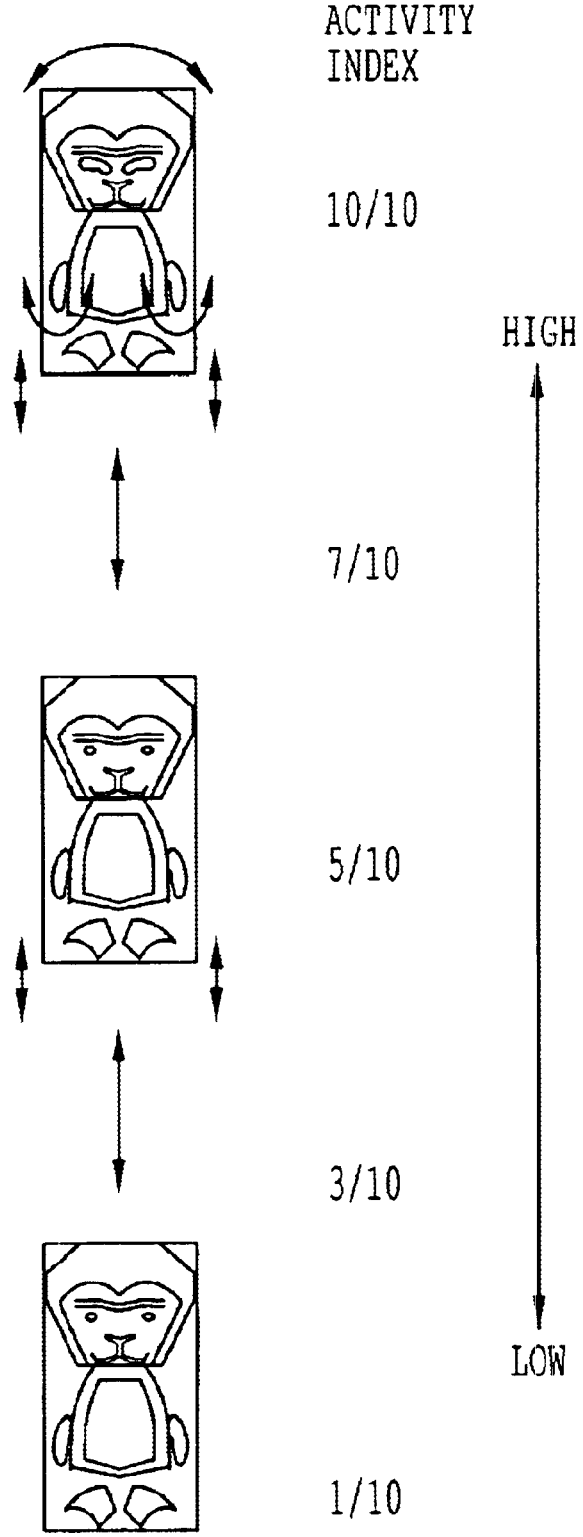
FIGS. 15A through 15C are diagrams for describing virtual reality life object activity index.

FIGS. 15A through 15C are conceptual diagrams in which the behavioral sequence of each part of the virtual reality pet is dynamically changed as the activity index of the virtual reality pet changes. When the activity index is low, only a small movement such as bending of knees as shown in FIG. 15A; when it high, the virtual reality pet can wave its arms or shake its head as shown in FIG. 15C for example.

Figure 16A:
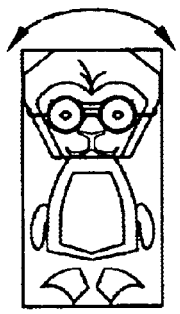
FIGS. 16A through 16C are diagrams for describing virtual reality life object intelligence quotient.
Figure 16B:
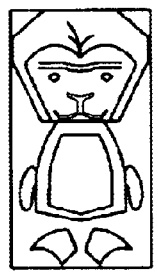
Figure 16C:
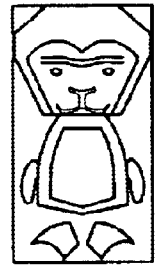

FIGS. 16A through 16C are conceptual diagrams in which hair is added to the virtual reality pet or glasses are put on it as the intelligence quotient of the virtual reality pet changes.

The intelligence quotient, one of the growth parameters, is incremented by 0.1 point based on the access event caused by the operation of the calling button A shown in FIG. 9, thereby changing the appearance of the virtual reality pet as shown in FIGS. 16A through 16C.

The language index is incremented by 0.1 point according to the age of the virtual reality pet based on the access event caused by the operation of the call button A shown in FIG. 9 or the timer event, thereby changing the style of text in chat sentence editing processing. For example, chat of a virtual reality pet having a small point is performed using hiragana or katakana Japanese syllabary and a chat of a virtual reality pet having a large point is performed using text including kanji Chinese characters.

The sociability index is incremented or decremented by 0.1 point according to the frequency of chat with the keeper. If the frequency is high, sociability increases; if it is low, sociability decreases. A virtual reality pet having a sociable and positive character takes on good attitude and countenance. Conversely, a virtual reality pet having an introvert and negative character takes on poor attitude and countenance.

The independence index is incremented by 0.1 point as a virtual reality pet ages based on timer event, gradually becoming independent of the keeper, rejecting commands of the keeper for example.

The activity index is determined based on the age, appetite index, and health index, affecting the behavior of a virtual reality pet as shown in FIGS. 15A through 15C. Also, the activity index is incremented by 0.1 point based on the event caused by operating the play button E shown in FIG. 9, affecting the behavior of the virtual reality pet such as gradually quickening getaway. The weight of the virtual reality pet is decreased to decrement its physique index, dynamically changing its appearance as shown in FIG. 13.

The mood index is determined by the access event caused by operating the call button A shown in FIG. 9 and the access frequency based on timer event, thereby affecting the countenance of a virtual reality pet as shown in FIGS. 14A through 14C.

On the other hand, the keeper data in the growth parameter control table is composed of the name of the keeper, a means (or method) for making contact with the keeper, and the address of the contact.

If the contacting means is 0, contact to the keeper is performed by a message statement through electronic mailing via the Internet 7. If the contacting means is 1, contact to the keeper is performed by converting text data of a message statement into a voice by an automatic reading tool on the communication server 16 and inputting the voice into the analog telephone 18. If the contacting means is 2, contact to the keeper is performed by a message statement to the PHS terminal 23 by use of an electronic mail service based on the data transmission protocol of PIAFS (PHS Internet Access Forum Standard). If the contacting means is 3, contact to the keeper is performed by a written document to the facsimile 19. If the contacting means is 4, contact to the keeper is performed by a message statement to the pager terminal 24.

The keeper data as described above is controlled to realize the capability of contacting the keeper by use of the existing communication infrastructure to be describe later and the capability of simplified operation of a virtual reality pet by use of the existing communication infrastructure.

The above-mentioned system is summarized as follows. Namely, the growth parameter (indicative of outer growth or inner growth (personality)) of a virtual reality life object existing in a shared virtual space is controlled by the AO server 13, this growth parameter changing with occurrence of a predetermined event (an event caused by a user operation or passing of predetermined time). Based on the growth parameter transferred from the AO server 13, the script for dynamically changing one or both of the appearance (shape, attitude, size, or color) and the behavioral sequence of the virtual reality life object is interpreted to display the virtual reality life object according to the growth parameter on the client PCs 1 and 2.

The AO server 13 for controlling the autonomous behavior of a virtual reality life object existing in a shared virtual space is provided with a control table for controlling growth parameters for the virtual reality life object that change with occurrence of a predetermined event (an event caused by a user operation or passing of a predetermined time). A growth parameter read from the control table upon request from a client or occurrence of a predetermined demand is sent to one or both of the requesting client and another client.

As described above, the growth parameter is a value indicative of the degree of external growth to be calculated based on the occurrence of a predetermined event (an event caused by a user operation or passing of a predetermined time) from the birth of a virtual reality life object. Therefore, the outer growth parameter defines the outer change of a virtual reality life creature or a virtual reality pet (AO) according to the age from baby to grown-up to aged.

The growth parameter is also a value indicative of the degree of inner growth (character) to be calculated based the occurrence of a predetermined event (a user operation or passing of a predetermined time) for a virtual reality life object. For example, a virtual reality life object having a sociable and positive character takes on good attitude and countenance. Conversely, a virtual reality life object having a dark and negative character takes on bad attitude and countenance. Thus, the change in the character of a virtual reality life creature or a virtual reality pet (AO) is specified by the inner growth parameter.

For the inner growth parameter, a different value is calculated according to the type of an event for a virtual reality life object, updating the degree of the inner growth. If the character of a virtual reality pet for example is controlled by the AO server 13, 0.1 point is added to a predetermined index of the growth parameter according to the type of a message sent from each client; for example, every time the virtual reality pet is talked to in chat. Every time, the virtual reality pet is praised by pressing of the praise button D, 0.2 point is added. Every time the virtual reality pet is scolded by pressing of the scold button F, 0.2 point is subtracted from the predetermined index. Thus, the calculation is performed based on predetermined arithmetic equations.

The AO server for controlling the autonomous behavior of a virtual reality life object in a shared virtual space is provided with a growth parameter control table indicative of the degree of growth of each virtual reality life object. This control table holds the birth date of each virtual reality life object. Based on the elapsed time starting from this birth date, the growth parameter according to the age of each virtual reality life object is calculated. The control table is updated by the newly calculated growth parameter.

The autonomous behaviors of plural virtual reality life objects in a shared virtual space are independently controlled by the AO server 13 (the single AO server 13 may control plural growth parameter control tables or the AO server 13 and the AO server 14 may control the plural control tables separately). Thus, the growth parameter control tables indicative of the growth degrees of different virtual reality life objects may be provided separately to control the growth parameters of the different virtual reality life objects independently.

In addition, various applications such as described below for example are possible.

For example, the AO server 13 for controlling the autonomous behavior of a virtual reality life object in a shared virtual space may be provided with a control table for controlling the ID (a nickname for example of the virtual reality life object set by user) of a client who accessed the virtual reality life object (the control items of this control table may be included in the growth parameter control table or this control table may be provided independently). Based on this control table, an event indicative of an intimacy emotional expression may be started according to the access by the client having this ID. Thus, holding the degree of intimacy (access count and contents) on the AO server 13 can realize a pet (virtual reality life) object that approaches its keeper when the keeper has entered the world (the shared virtual space).

The ID of a client who has set or reset a virtual reality life object may be stored in the growth parameter control table as the keeper of this virtual reality life object. Updating of this ID is disabled until the life of the virtual reality life object expires. At the time of the expiration, this ID may be deleted. This can realize a virtual reality pet that is loyal to its keeper who gave birth to it (namely set it in the shared virtual space). Further, when the life of a virtual reality life object expires (namely, it is reset), a child of this virtual reality life object may be automatically generated and the ID of the keeper of its parent may be set to this child. This makes the child pet be also loyal to the keeper of its ancestor.

The AO server 13 may be provided with a history control table for controlling the history of a client who has set or reset a virtual reality life object. The client higher in access frequency than other clients can start a behavioral sequence indicative of more intimate emotional expression. As the access frequency lowers, the degree of intimacy lowers, thereby realizing a whimsical pet of which degree of intimacy changes with access frequency.

If the movement of a virtual reality life object is controlled according to the position of client in a shared virtual space, the virtual reality life object immediately appears just in front of the client (keeper) when the client enters the shared virtual space, thereby realizing the virtual reality life object that always follows its keeper about.

An event in a shared virtual space (for example, an experience of being fed by another client) may be reported by the virtual reality life object to the client through a text-based chat window, thereby realizing an intimacy emotional expression.

Experience of an event in a shared virtual space may be reported from the virtual reality life object to the client through a voice chat to provide an intimacy emotional expression. Alternatively, this report may be made through a voice chat capability as an analog voice message based on text-to-voice conversion supported by text reading software. Alternatively still, several types of voice messages may be sampled and compressed to be stored as digital voice compressed data in the hard disk (of the AO server 13 or the client PC 1). Then, an optimum voice message is selectively read from the hard disk, decompressed, and reported to the client as an analog voice message through the voice chat capability. For the conversion between text and voice, the technology disclosed in Japanese Patent Laid-open No. Hei 7-105848 is available.

The following describes the capability of notification to the client based on an existing communication infrastructure and the capability of simplifying the operation of a virtual reality pet based on an existing communication infrastructure.

For example, if the appetite index of a virtual reality life object increases or its remaining life time goes below a predetermined value, the virtual reality life object (the AO server 13) notifies, through the mail server 15 or the communication server 16, its keeper at the keeper's address of contact of this change by use of the contacting means (FIG. 8) previously set to the growth parameter control table. If the keeper cannot immediately access the personal computer under situations that the keeper is away from the personal computer or the personal computer itself is malfunctioning for example, the keeper can later check requests of the virtual reality pet and make communication with it.

On the other hand, a service provider for providing services for virtual reality pet breeding such as described so far can evoke a motivation of a kind that the user must soon access the virtual reality pet. This provides a by-product that the service provider can ensure regular access, contributing to its stable management.

The following describes a particular example for realizing the above-mentioned notification capability based on an existing communication infrastructure.

The communication server 16, one of the servers for controlling the autonomous behavior of a virtual reality life object in a shared virtual space, is provided with a communication control table (a table corresponding to the keeper data in the growth parameter control table shown in FIG. 8) for controlling the type of a message notification means (or a message notification method) for making notification to the user, or the keeper of each virtual reality life object and controlling the address of contact of the keeper. As the state of the virtual reality life object changes (the communication server 16 is notified of this change by the AO server 13), the message is sent to the address of contact by use of the communication means registered in the communication control table. This allows actual communication from the shared virtual world to the real world.

The ID for identifying each user, or the keeper of each virtual reality life object and the history access by the user having this ID are controlled by this communication control table. Based on the access history, a message "I miss you" for example may be sent to a user who has not accessed his or her virtual reality life object for over a certain period.

Further, based on the access history, an optimum message statement may be selected from among plural message statements. The day after the day on which access was made by the user, a message "Thank you for playing with me. Let's play again" for example may be sent from the virtual reality life object to its keeper. If no access has been made for over one week for example, a message "Are you busy these days? Please come to play with me sometimes" for example is sent.

A transition in the state of a virtual reality life object is sensed based on the updated content of the growth parameter control table, an optimum message statement is selected from among plural message statements, and the selected message is sent. For example, the day after the day on which the virtual reality life object was fed much, a message "I'm still full" for example is sent. If no access has been made for one week for example, a message "I'm starving to death" for example is sent. In a scenario in which a virtual reality life object is aged one year in one week, its birthday comes every week and a message "I have become 10 years old today. Please look at grown-up me" for example is sent. If the allocated remaining life time is nearly expiring, a message "I have to go somewhere far away soon. Please be with me when I die" for example is sent.

The mail server 15 may be provided with a part of the communication control table associated with electronic mail to send a text-based message to the keeper of each virtual reality life object at his or her electronic mail address (including his or her ID) by the communication control table of the mail server 15.

In addition to an electronic mail transmitted through the Internet 7, a message may be sent from the communication server 16 through the public telephone network 17 to the PHS terminal 23 based on PIAFS (PHS Internet Access Forum Standard) or (DATA32 for example or to a pager (the pager terminal 24) to be displayed on the LCD of the PHS or the pager.

Alternatively, the telephone number (including the ID) of the user of each virtual reality life object may be controlled by the communication control table to automatically calling the user at his or her registered telephone number from the communication server 16, thereby sending a voice message. In this case, this notification may be made as an analog voice message based on text-to-voice conversion supported by text reading software through the ordinary telephone 8 or a mobile telephone (the PHS terminal 23). Alternatively, several types of voice messages may be sampled and compressed to be stored as digital voice compressed data in the hard disk (of the AO server 13 or the client PC 1). Then, an optimum voice message is selectively read from the hard disk, decompressed, and reported to the client as an analog voice message.

The facsimile number (including the ID) of the user of each virtual reality life object may be controlled by the communication control table to automatically call the user at this facsimile number, thereby sending a message to the facsimile 19.

Further, by use of a terminal such as the telephone 18 that has received the above-mentioned message from the virtual reality pet, two-way communication may be made between the keeper and its virtual reality pet from this terminal by a simplified operation.

The following describes a particular example of realizing the capability of performing a simplified operation on a virtual reality pet by use of an existing communication infrastructure.

For example, the shared server 12 can interpret an operation command returned with the ID (caller ID) of the user through the PHS terminal 23 or the telephone 18, recognize the operation command as a message to the corresponding virtual reality life object, send the message to the AO server 13, and reflect the content of the message onto the state transition (updating of a growth parameter) of the virtual reality life object.

For the above-mentioned returned operation command, a DTMF (Dual-Tone Multi Frequency) signal that is generated when a push button on the telephone 18 is pressed for example may be used.

In addition, by use of Web-On-Call (registered trademark) voice browser by NetPhonic Communications Inc. (http://www.netphonic.com/) for example, various notifications to a virtual reality pet may be made. This voice browser allows access to servers from the ordinary telephone 18 by voice. This voice browser has a text reading capability, so that a mail from a virtual reality pet can be heard in voice. Moreover, this voice browser can also send text by facsimile or electronic mail.

It should be noted that the shared server 12, the AO servers 13 and 14, the mail server 15, and the communication server 16 execute various capabilities in a shared manner, thereby realizing a service for providing a shared virtual space to client PCs as a whole system.

The following describes a chat capability to be executed in this shared virtual space. Chat is classified into public chat and personal chat. In public chat, conversation uttered by one client (user) at a predetermined location in the shared virtual space is transmitted to other nearby clients (users) in the shared virtual space.

On the other hand, in personal chat, conversation is made only with a specified party. This specification is performed by clicking the mouse button on a desired virtual reality life object while pressing the shift key of the keyboard 42 for example. When the other party of chat is specified, chat made by the client who made that specification is directed only to the specified party.

In voice chat, contents of chat are transmitted in a voice signal; in text chat, they are transmitted in text. In voice chat, voice data captured by the microphone 36 is transmitted to the clients (users) nearby or specified virtual reality life objects to be sounded from the speakers 37 and 38 of the PCs of these clients.

In text chat, text entered by from the keyboard 42 is transmitted also to the clients (users) of nearby or specified virtual reality life objects to be displayed on the CRT monitor 45 of the client PCs.

The user can select between voice chat and text chat as required.

Figure 17:
FIG. 17 shows a photograph indicative of a display example of a shared virtual reality space.

The following describes particular examples of display on the CRT monitor on a client PC. FIG. 17 shows a display example of a bird's eye view of the three-dimensional shared virtual reality space provided when access is made from the client PC1 to the shared server 12 for example.

Figure 18:
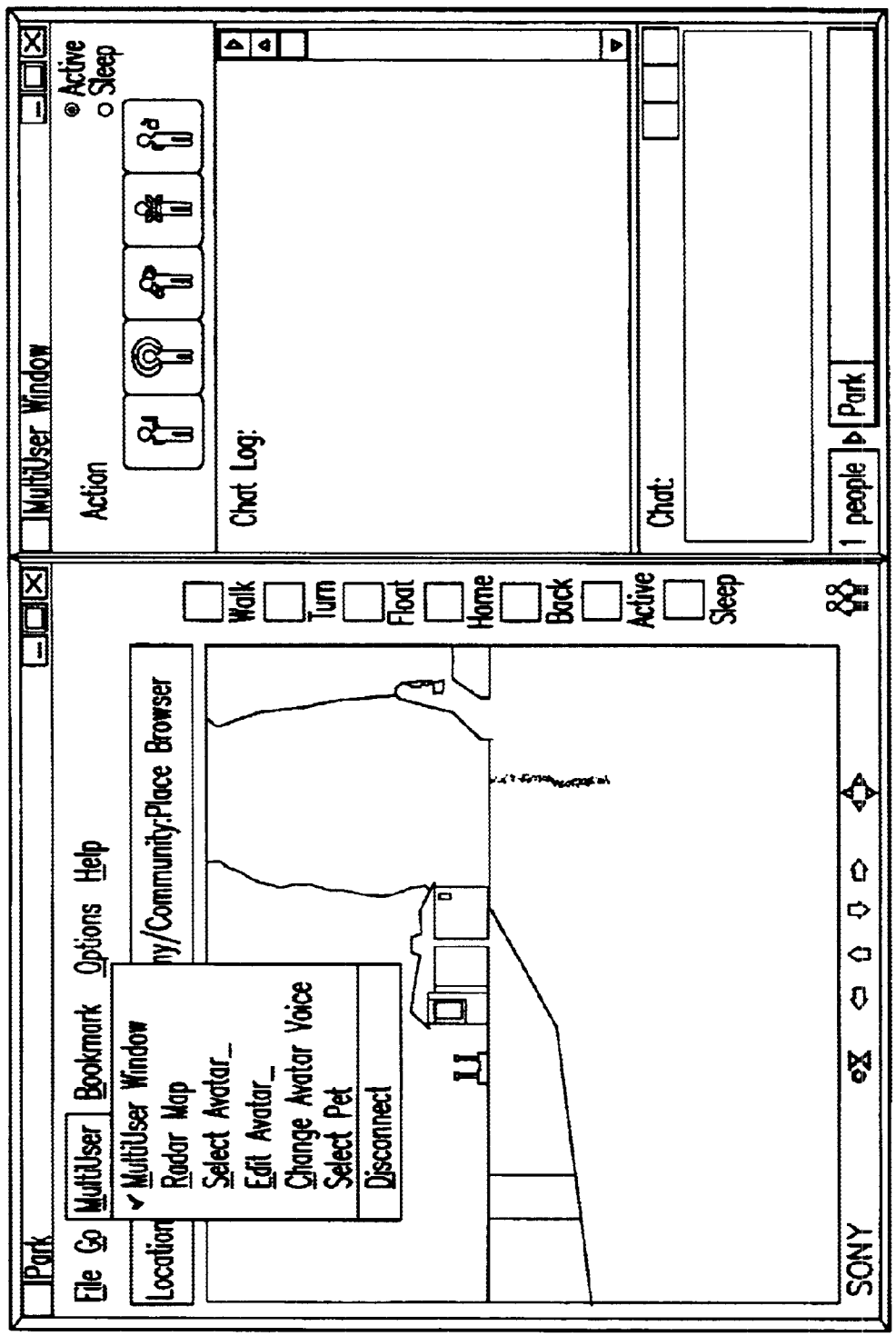
FIG. 18 shows a photograph indicative of another display example of the shared virtual reality space.
Figure 19:
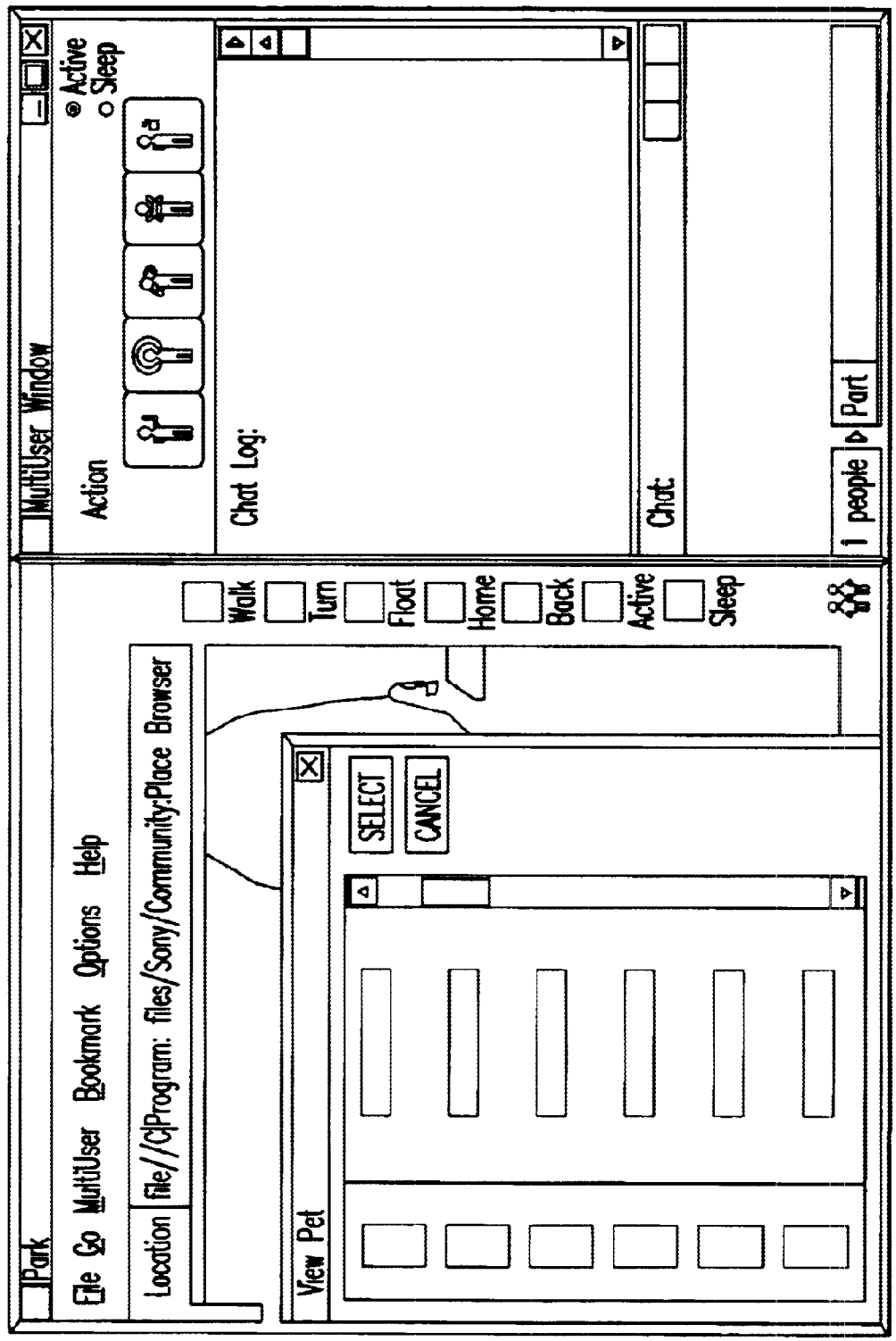
FIG. 19 shows a photograph indicative of still another display example of the shared virtual reality space.

To select a virtual reality pet to be bred in the shared virtual space, the client clicks "Multi User" item in the screen. When this item is clicked, a menu bar appears as shown in FIG. 18. From the menu bar, the client selects "Select Pet." Then, "view Pet" window appears as shown in FIG. 19, in which various virtual reality pet images are displayed. The client selects a desired one of these virtual reality pets. It should be noted that the images of virtual reality pets displayed in the "View Pet" window are the initial images, namely the images at their births. As described earlier, the image of each virtual reality pet gradually changes as it grows. When the user has determined the virtual reality pet to be bred, the client presses the "SELECT" button with the mouse 41.

Figure 20:
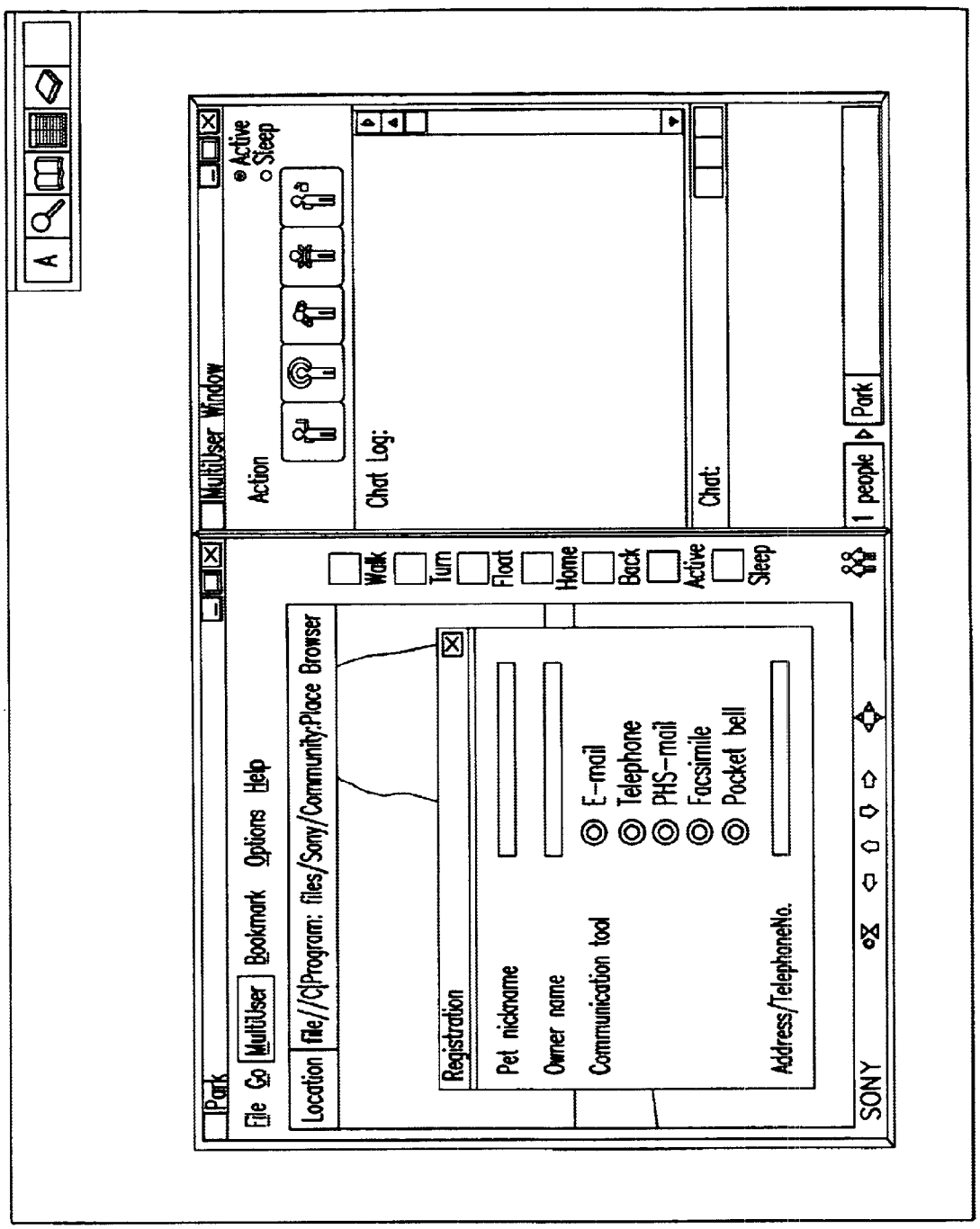
FIG. 20 shows a photograph indicative of yet another display example of the shared virtual reality space.

When the selection of the virtual reality pet has been completed, a window "Registration" for registering the information about the selected virtual reality pet appears as shown in FIG. 20. The client enters the name of the virtual reality pet "Pet Nickname," the name of the owner (keeper of the pet) "Owner Name," and the address and telephone number "Address/Telephone No." of the owner from the keyboard 42.

Further, the client selects a communication tool as the above-mentioned contacting means or notification means from "E-mail," "Telephone," "PHS-mail," "Facsimile," and "Pocket Bell (pager)."

Figure 21:
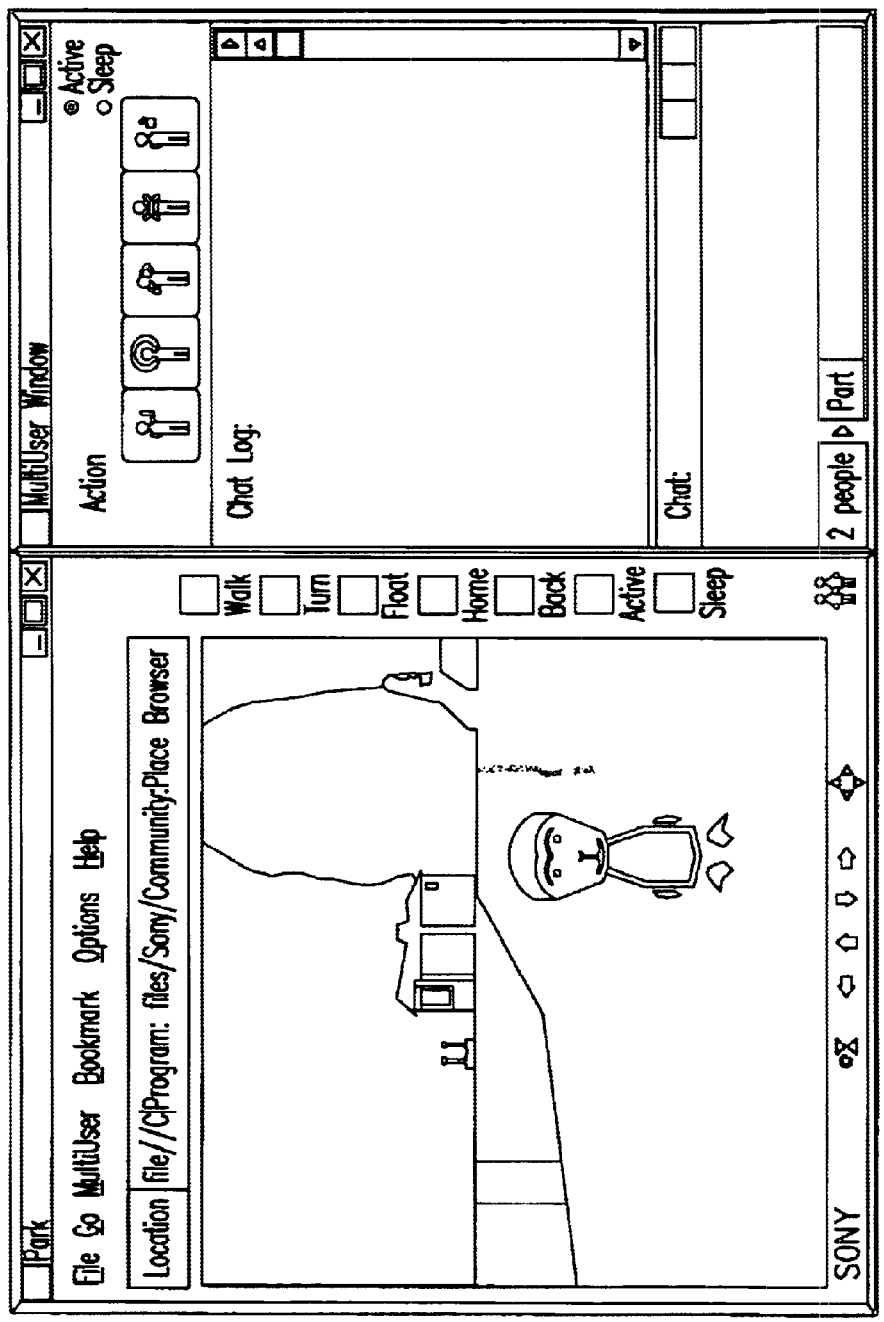
FIG. 21 shows a photograph indicative of a different display example of the shared virtual reality space.
Figure 22:
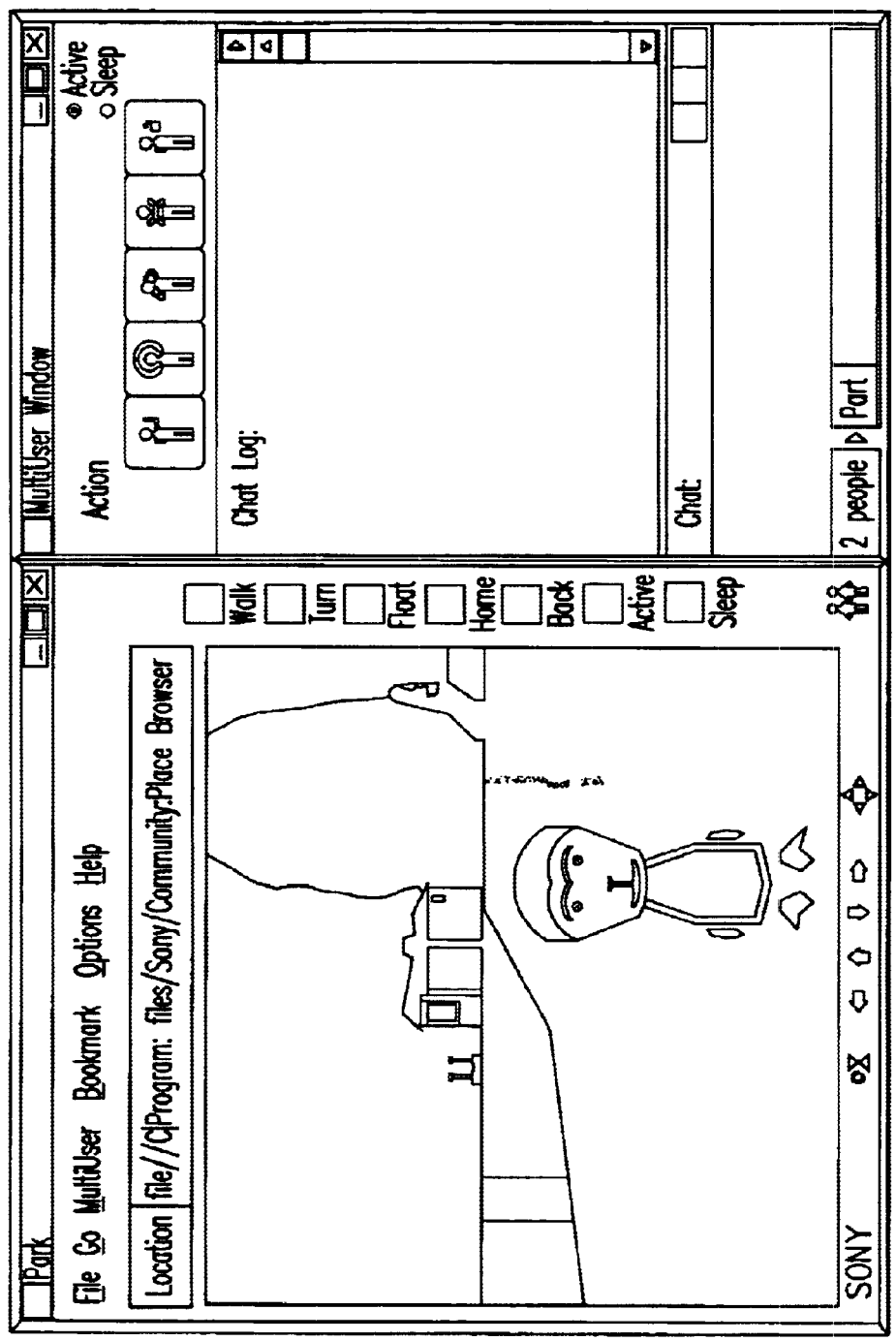
FIG. 22 shows a photograph indicative of a still different display example of the shared virtual reality space.

FIG. 20 shows an example in which a monkey for example has been selected as the virtual reality pet. As described earlier, this virtual reality pet (monkey) grows based on growth parameters to be updated by various events. FIG. 21 shows a state of the virtual reality pet in which it has grown from the state shown in FIG. 20. As shown in FIG. 21, the pet is larger in physique and its countenance has changed to that of an adult monkey.

Thus, changes closer to reality can be enjoyed in a shared virtual space.

Figure 23:
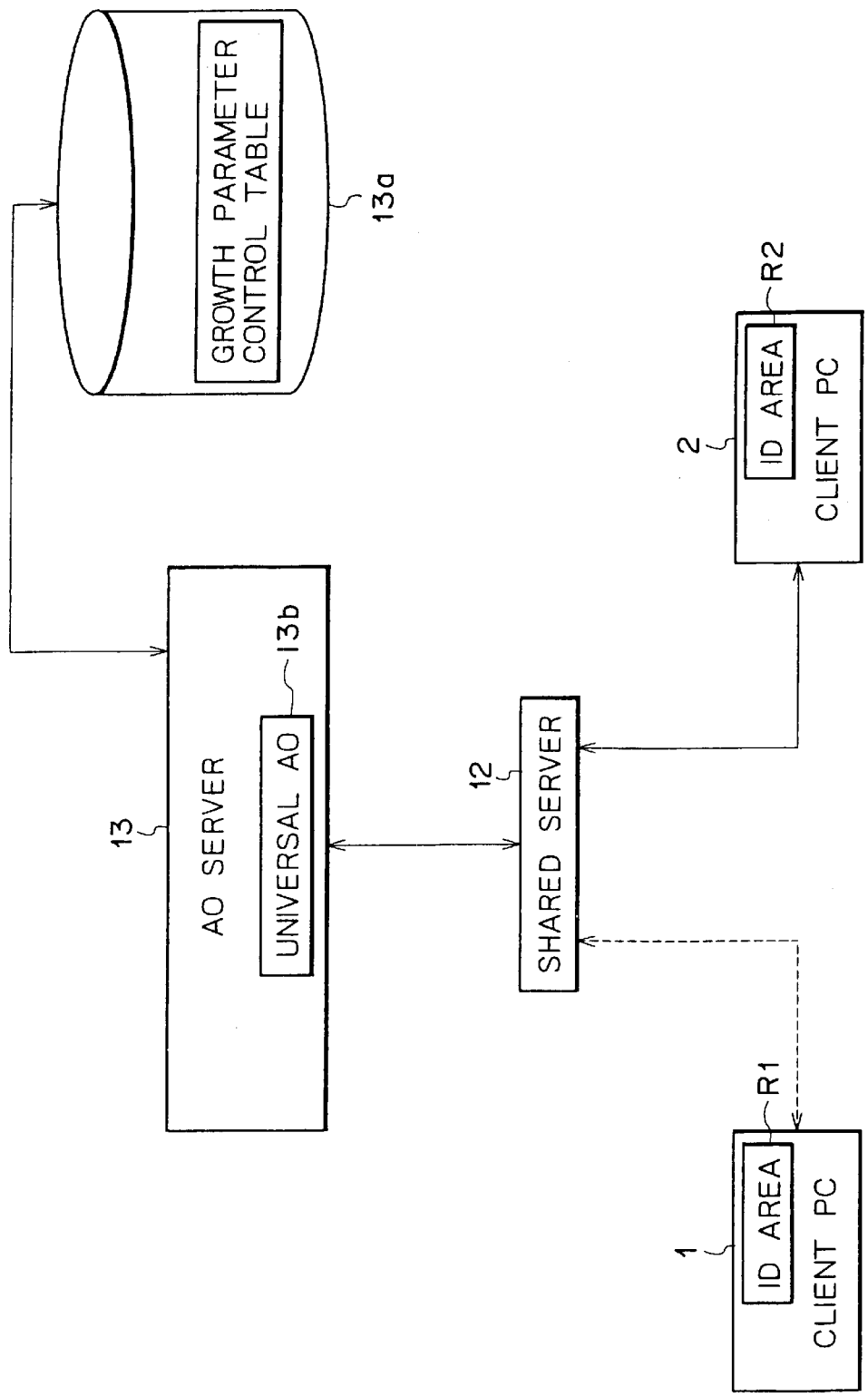
FIG. 23 is a diagram illustrating the state of connection between client PC1, client PC2, AO server, hard disc 13a, and shared server.

FIG. 23 shows a state of connection between the client PC1 corresponding to a user ID, the client PC2 corresponding to a user ID, the AO server 13, the hard disk 13a, and the shared server.

It should be noted that the connection between the client PC1 and the shared server 12 is indicated by a dotted line means that the client PC1 accesses the shared server 12 for the first time, for example. The connection between the client PC2 and the shared server 12 is indicated by a solid line means that the client PC2 has accessed the shared server 12 before.

Figure 24:
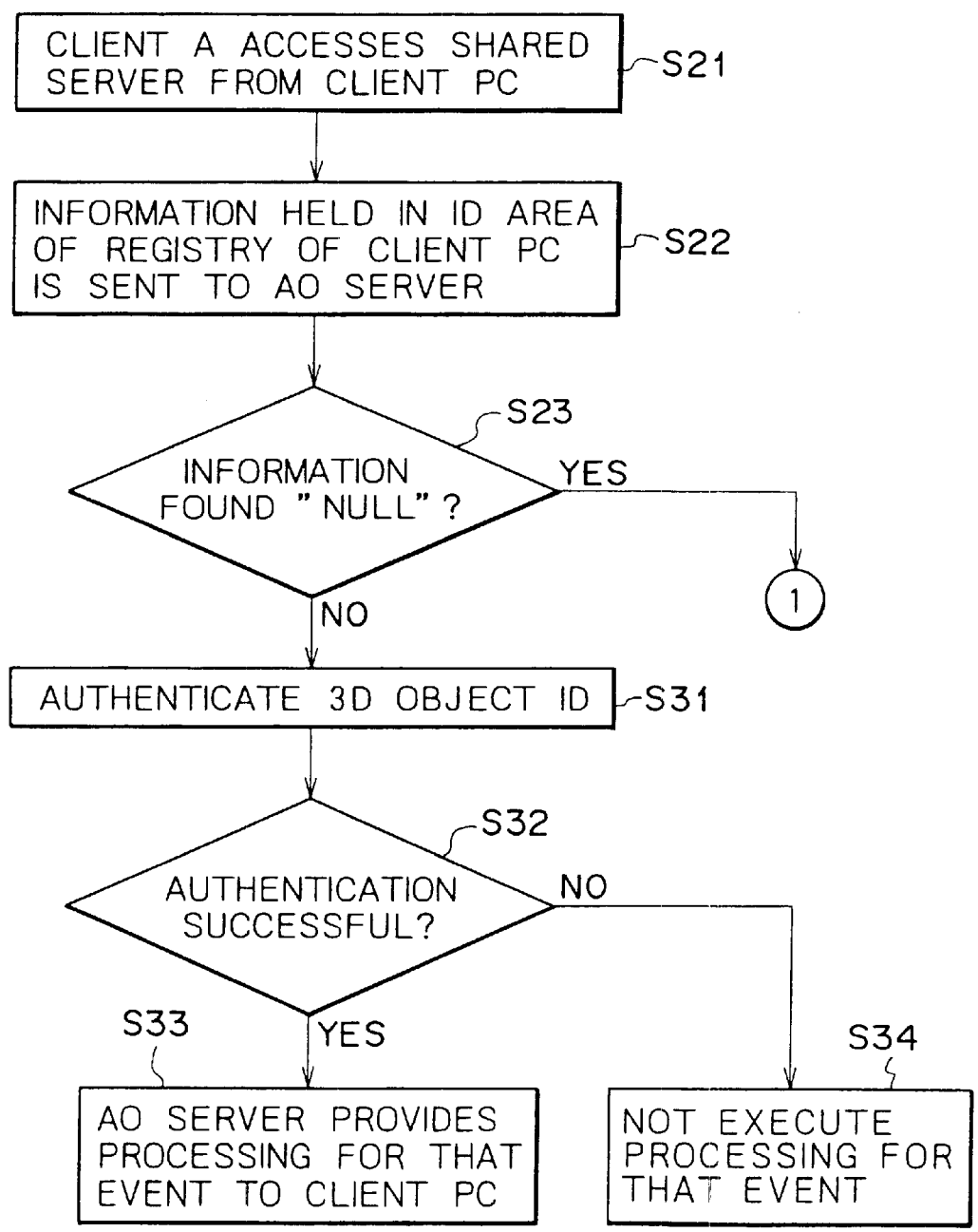
FIG. 24 is a diagram for describing a processing procedure for obtaining a 3D object which has been determined in advance.
Figure 25:
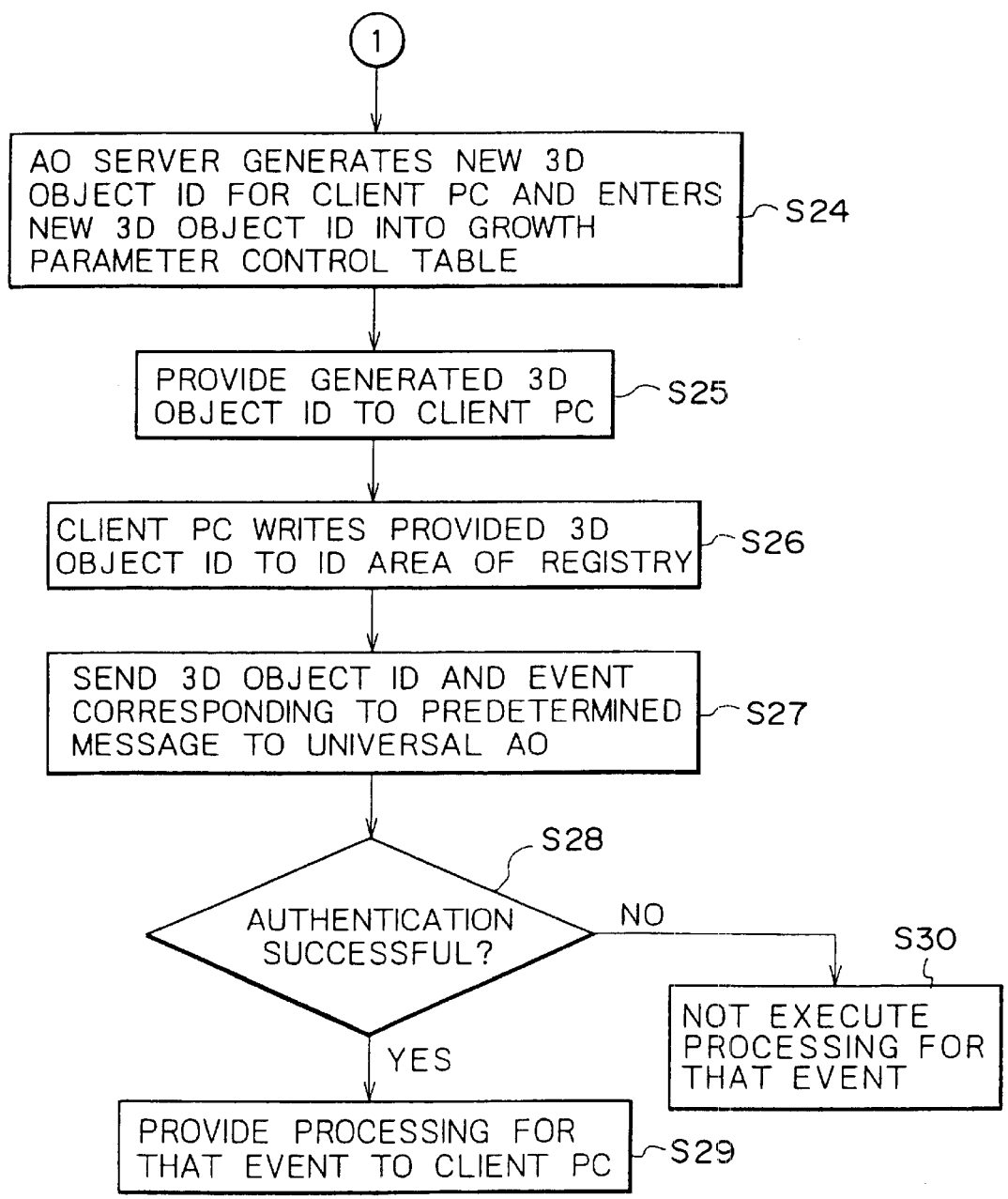
FIG. 25 is a diagram for describing a processing procedure for obtaining a new 3D object ID where no 3D object has been determined in advance.

The following describes user ID processing with reference to FIG. 23 and the flowcharts of FIGS. 24 and 25. In this example, one user rears one virtual reality pet, so that the 3D object ID for identifying the 3D object expressing a virtual reality pet is the user ID which identify the user.

When the client $A_1$ operating the client PC1 accesses the shared server 12 in the step S21, the client PC1 sends information held in a predetermined area (hereafter referred to as an ID area) of a registry R1 controlling the system information of Windows 95 to a universal AO 13b of the AO server 13 through the shared server 12 by use of the attribute capability of Community Place Browser/Bureau in the step S22.

The ID area in the registry R1 stores information such as numbers corresponding to the 3D object IDs registered in the growth parameter control table stored in the HDD 13a. In this case, however, as it is assumed that the client PC1 accesses the shared server 12 for the first time, the 3D object ID is not determined at that moment. Therefore, no information is held in the ID area of the registry R1 of the client PC1. To be more specific, information corresponding to "NUL" is sent from the ID area of the registry R1 of the client PC1 to the universal AO 13b of the AO server 13.

Then, the universal AO 13b of the AO server 13 receives the information from the ID area of the registry R1 of the client PC and checks the content of the received information. If the received information is found "NUL" in the step 23, then the AO server 13 issues a new 3D object ID, not duplicating other 3D object Ids, to the client PC1, the new 3D object ID being entered in the growth parameter control table stored in the hard disk 13a in the step S24.

Next, in the step S25, the AO server 13 provides to the client PC1 the 3D object ID issued thereto.

In the step S26, the client PC1 received the issued 3D object ID and writes the received 3D object ID into the ID area of the registry R1. In the step S27, the client PC1 sends the 3D object ID from the ID area of the register R1 to the universal AO 13b of the AO server 13 through the shared server along with an event corresponding to a predetermined message.

In the step S28, the universal AO 13b of the AO server 13 receives the event and the 3D object ID and references the growth parameter control table stored in the hard disk 13a to authenticate the 3D object ID. In the step S29, if the authentication is successful, the AO server 13 provides the client PC1 with the processing for that event.

In the step 30, if the authentication fails, the AO server 13 does not process the event. on the other hand, because the client PC2 already holds its 3D object ID in the ID area of its registry R2, when the client PC2 accesses the shared server 12 in the step 21, the client PC2 sends the 3D object ID and an event to the universal AO 13b of the AO server 13 in the step S22.

In the step S23, the universal AO 13b of the AO server 13 receives the event and the 3D object ID and judges whether the information held in the ID area of the registry R2 is "NUL" or not. Because this information is not "NUL," the step S31 follows and the universal AO 13b of the AO server 13 references the growth parameter control table stored in the hard disk 13a to authenticate the 3D object ID in the step S31. In the step S32, if the authentication is successful, the AO server 13 provides the client PC2 with the processing for that event in the step S33.

If the authentication fails, the AO server 13 does not operate the processing corresponding to the event in the step S34.

It should be noted that, in the present embodiment, the client PC1 that accesses the shared server 12 for the first time has not sent the event to the universal AO 13b of the server AO 13 as shown in the step S22. Alternatively, the event may be sent to the universal AO 13b of the server AO 13 along with the information held in the ID area of the registry R1 beforehand, the event subsequently being held in the universal AO 13b until the authentication is successful. This alternative setup makes it unnecessary for the client PC1 to send the event to the universal AO 13b in the step S27.

Figure 26:
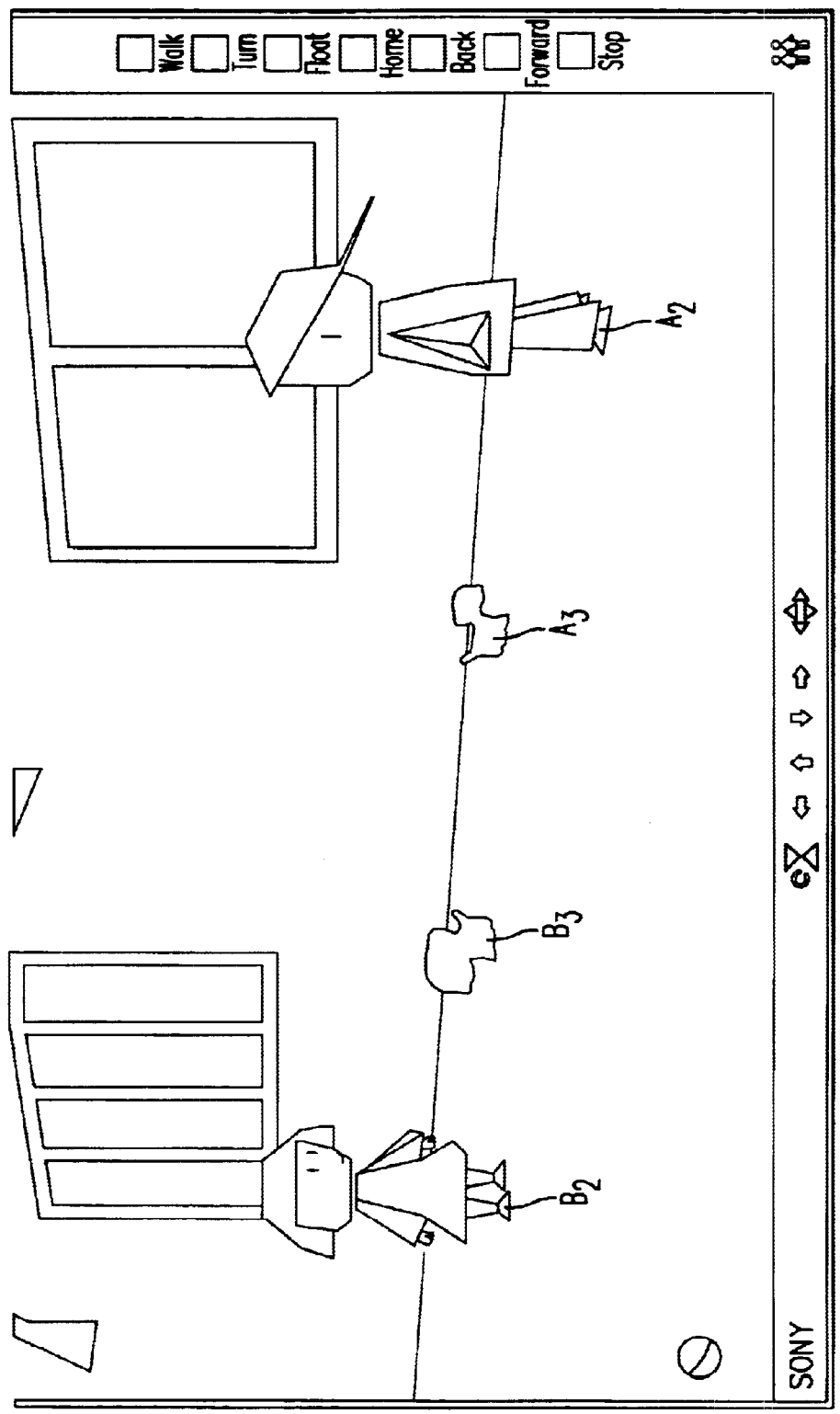
FIG. 26 shows a photograph indicative of a display example of a shared virtual reality space.

FIG. 26 shows an image provided by the AO server 13 in response to the access events from the client PC1 and the client PC2. In this example, an avatar $A_2$ of the client $A_1$ of the client PC1 and an avatar $B_2$ of a client $B_1$ of the client PC2 are accompanied by virtual reality pets (dogs) $A_3$ and $B_3$ respectively. This image is displayed on the CRT monitor 45 of the client PC1 (or the client PC2).

Figure 27:
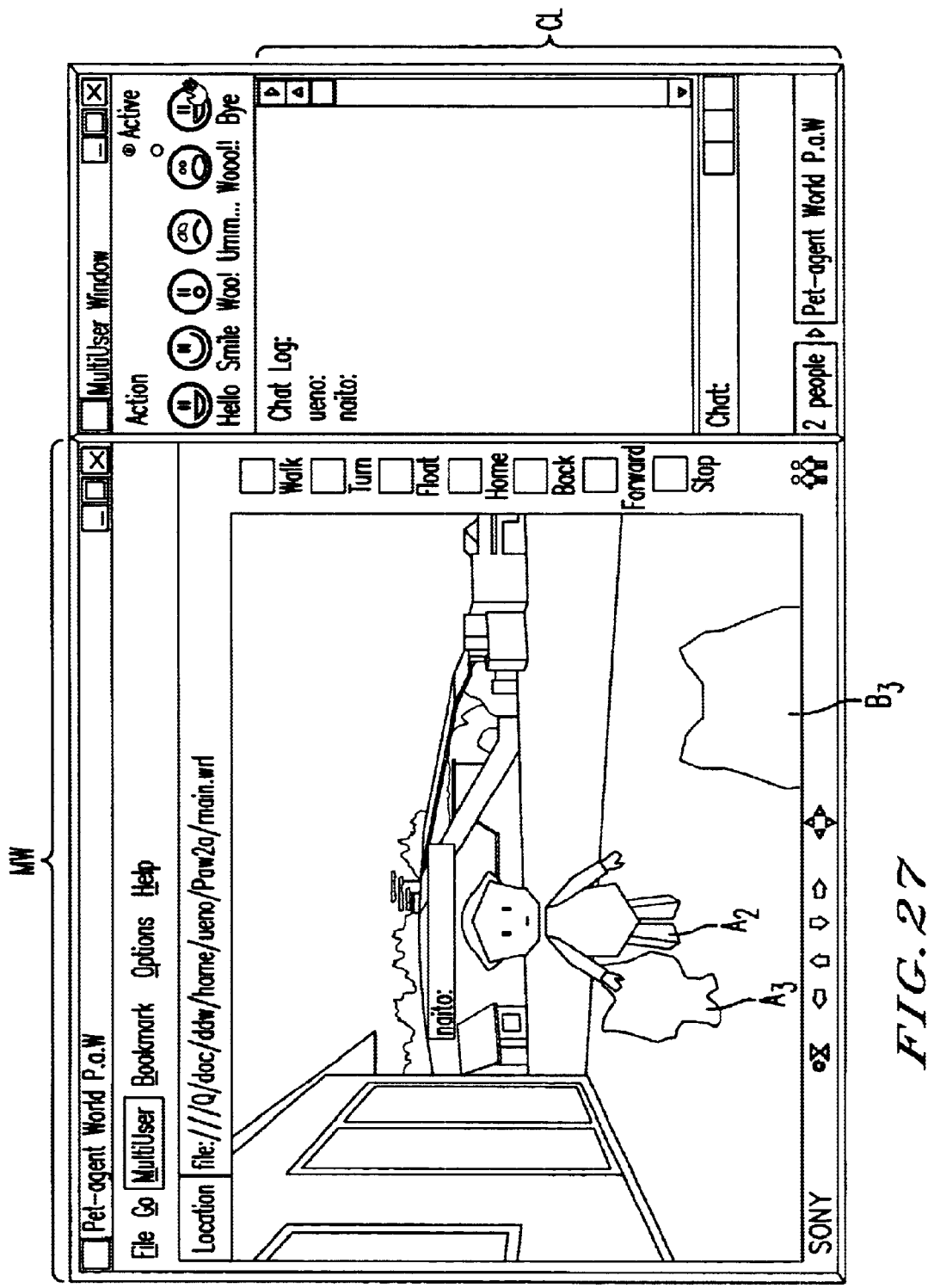
FIG. 27 shows a photograph indicative of another display example of a shared virtual reality space.

FIG. 27 shows an image provided in response to a name-card exchange event from the client PC1 to the client PC2. In this example, the avatar $B_2$ is facing the avatar $A_2$ accompanying the virtual reality pet $A_3$ when viewed from the viewpoint of the avatar $B_3$ (not shown in FIG. 25) accompanying the virtual reality pet $B_3$. In this example, as shown in a chat log column CL displayed adjacent to the right side of the main window MW of FIG. 25, the client $B_1$ is getting name-card information of the client $A_1$ from the avatar $A_2$ through the avatar $B_2$. In this example, the name of the avatar $A_2$ is "naito" and the name of the avatar $B_2$ is "ueno."

In the above-mentioned case, one user rears one virtual reality pet. Therefore, the 3D object ID also serves as user identification. If the user can rear a plurality of virtual reality pets, the user ID is provided separately. This user ID is held in the ID area of the registry of the client PC. A table for controlling the relation between the user ID and the plurality of 3D virtual reality objects is arranged in the AO server 13 for example.

The program for executing the above-mentioned various processing operations may be provided by being recorded on recording media such as a magnetic disc and CD-ROM disc or through networks such as the Internet.

As described and according to an information processing apparatus described in claim 1 appended hereto, an information processing method described in claim 3 appended hereto, and a program providing medium described in claim 4 appended hereto, a terminal has a storage means for storing identification information, a transmitting means for transmitting the identification information stored in the storage means to a server, and a receiving means for receiving information corresponding to the identification information transmitted from the server. If no identification information is stored in the storage means, the terminal transmits information thereof to the server. The terminal receives identification information corresponding to predetermined information transmitted from the server in response to the above-mentioned information indicating that no identification information is stored in the storage means. The received identification information is then stored in the storage means. Consequently, the identification information for user identification can be held in a registry.

As described and according to an information processing apparatus described in claim 1 appended hereto, an information processing method described in claim 3 appended hereto, and a program providing medium described in claim 4 appended hereto, if access is made from a terminal without accompanying identification information, identification information corresponding to predetermined information is generated. The generated identification information is registered to be provided to the terminal. Consequently, services corresponding to the user identification information can be provided.

As described and according to an information system described in appended hereto, an information processing method described in appended hereto, and a program providing medium described in appended hereto, a terminal has a storage means for storing identification information, a transmitting means for transmitting the identification information stored in the storage means to a server, and a receiving means for receiving the identification information transmitted from the server. If no identification information is stored in the storage means, the terminal transmits information thereof to the server. The terminal receives identification information corresponding to predetermined information transmitted from the server in response to the information indicating that no identification information is stored in the storage means and stores the identification information received by the receiving means into the storage means. When an access is made from the terminal without accompanying identification information, the server generates identification information corresponding to predetermined information and registers the generated identification information to be provided to the terminal. Consequently, the user can received predetermined services from the server without inputting user identification information into the terminal.

As many apparently different embodiments of this invention may be made without departing from the spirit and scope thereof, it is to be understood that the invention is not limited to the specific embodiments thereof except as defined in the appended claims.

What is claimed is:

1. An information processing apparatus configured to be connected with a terminal that supplies identification information that identifies said terminal as a source of information or an indication that the identification information has not yet been assigned, comprising:

receiving means for receiving initial access information from said terminal;

a generating means for generating, when the access made from said terminal to said information processing apparatus is without said terminal identification information accompanying said access, said identification information;

a registering means for registering said identification information received from said generating means; and a providing means for providing said identification information from said generating means to said terminal.

2. The information processing apparatus as claimed in claim 1, further comprises:

a judging means for judging, when an access is made from any terminal that presents event information for predetermined processing by said information processing apparatus and said identification information, whether said identification information received from said terminal is registered in said registering means; and a processing executing means for executing, if said identification information is found registered, processing corresponding to said event information.

3. An information processing method, comprising the steps of:

receiving initial access information from said terminal;

generating, when the access made from a terminal to a processing apparatus is without identification information that identifies said terminal as a source of information, said identification information corresponding to predetermined information;

registering said identification information generated by said generating step in said processing apparatus; and providing said terminal with said identification information generated by said generating step.

4. A computer program providing medium carrying a program for use in an information processing apparatus, said program comprising the steps of:

receiving initial access information from said terminal;

generating, when the access made from a terminal to said processing apparatus without any identification information that identifies said terminal as a source of information, said identification information;

registering said terminal identification information generated by said generating step in said processing apparatus; and providing said terminal with said identification information generated by said generating step.

* * * * *